(12) United States Patent
Yamanaka

(10) Patent No.: US 12,704,705 B2
(45) Date of Patent: Aug. 11, 2026

(54) MICROSCOPE OBJECTIVE AND MICROSCOPE OBSERVATION SYSTEM

(71) Applicant: KYOCERA SOC Corporation, Yokohama (JP)

(72) Inventor: Takeshi Yamanaka, Tokyo (JP)

(73) Assignee: KYOCERA SOC Corporation, Yokohama (JP)

( * ) Notice: Subject to any disclaimer, the term of this patent is extended or adjusted under 35 U.S.C. 154(b) by 281 days.

(21) Appl. No.: 18/590,580

(22) Filed: Feb. 28, 2024

(65) Prior Publication Data

US 2024/0418976 A1 Dec. 19, 2024

(30) Foreign Application Priority Data

Jun. 13, 2023 (JP) ................................ 2023-096802

(51) Int. Cl.
*G02B 21/02* (2006.01)
*G02B 13/18* (2006.01)
*G02B 27/00* (2006.01)

(52) U.S. Cl.
CPC .......... *G02B 21/025* (2013.01); *G02B 13/18* (2013.01); *G02B 27/0025* (2013.01)

(58) Field of Classification Search
CPC .. G02B 21/025; G02B 13/18; G02B 27/0025; G02B 21/02; G02B 27/0068
See application file for complete search history.

(56) References Cited

U.S. PATENT DOCUMENTS 5,191,475 A * 3/1993 Terasawa ....... G02B 15/144109 359/676
7,349,162 B2 3/2008 Fahlbusch et al.
11,808,933 B2 11/2023 Tanabe
2013/0100537 A1 4/2013 Matthae et al.
2022/0179182 A1* 6/2022 Byler .................... G02B 13/24
2022/0350126 A1 11/2022 Shimada
2023/0070687 A1 3/2023 Kasahara

FOREIGN PATENT DOCUMENTS

JP H 05196873 A 8/1993
JP 2010164908 A 7/2010
JP 2012145788 A 8/2012
JP 6960487 B2 11/2021
JP 2022078638 A 5/2022
JP 2022169853 A 11/2022
JP 2023032561 A 3/2023

OTHER PUBLICATIONS

Van Stryland et al, Handbook of Optics, Devices, Measurements & Properties, Second Edition, vol. 2, 1496 pages.
Kingslake et al, Lens Design Fundamentals, Second Edition, 570 pages.
Japanese Office Action (w/English translation) for corresponding Application No. 2023-096802, dated Dec. 23, 2025, 9 pages.

* cited by examiner

*Primary Examiner* — Mariam Qureshi
(74) *Attorney, Agent, or Firm* — Dority & Manning, P.A.

(57) ABSTRACT

A microscope objective includes a first movable lens group that is movable along an optical axis, a first correction means configured to move the first movable lens group along the optical axis, a second movable lens group that is movable along the optical axis, and a second correction means configured to move the second movable lens group along the optical axis.

3 Claims, 25 Drawing Sheets

1
Bc
B
Ac
A2
A
A1
11
10
8 spherical aberration
default
moved
(+0.5mm)
0
0.1
0.2
0.3
0.4
0.5
0.6
0.7
0.8
0.9
1
1.00E−03
5.00E−04
0.00E+00
−5.00E−04
−1.00E−03
spherical aberration [mm]

1
L9
L8
FC
L7
L6
second
movable lens group
B
L5
L4
FB
A2
L3
first
movable lens group
A
A1
L2
FA
L1 ey
ex
546nm
707nm
405nm
588nm
656nm
Py
Px
Fig.9A
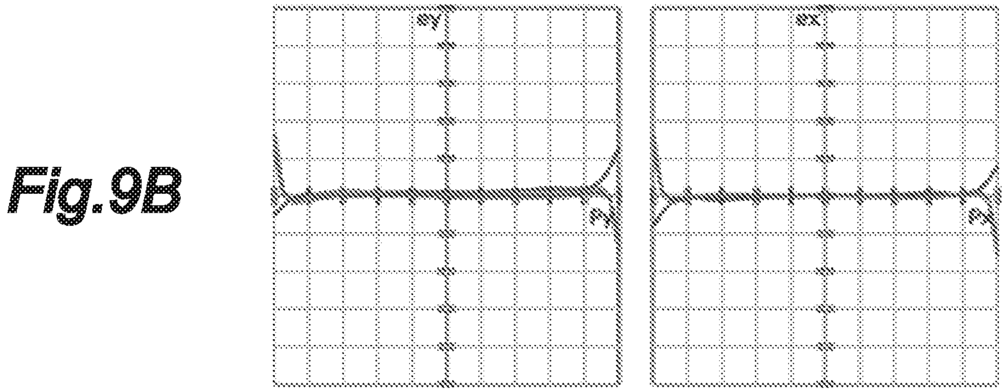
Fig.9B
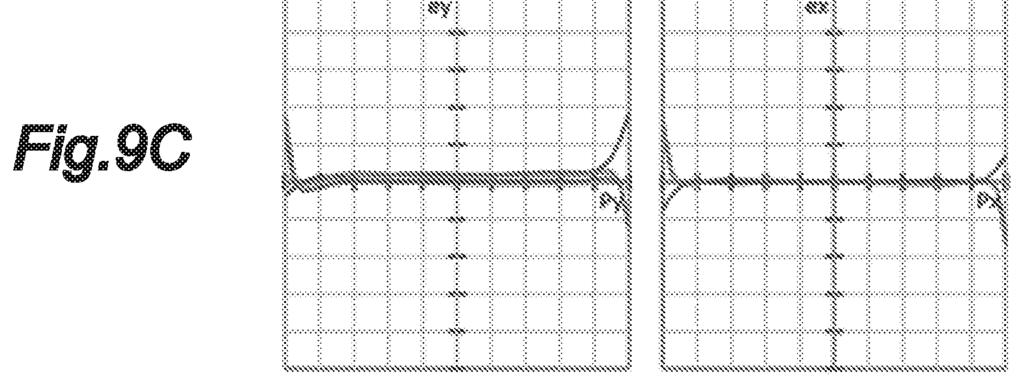
Fig.9C default setup
705nm
588nm
656nm
405nm
546nm
Millimeters
1
0.9
0.8
0.7
0.6
0.5
0.4
0.3
0.2
0.1
0

*Fig.13* second setup

Figure 13:
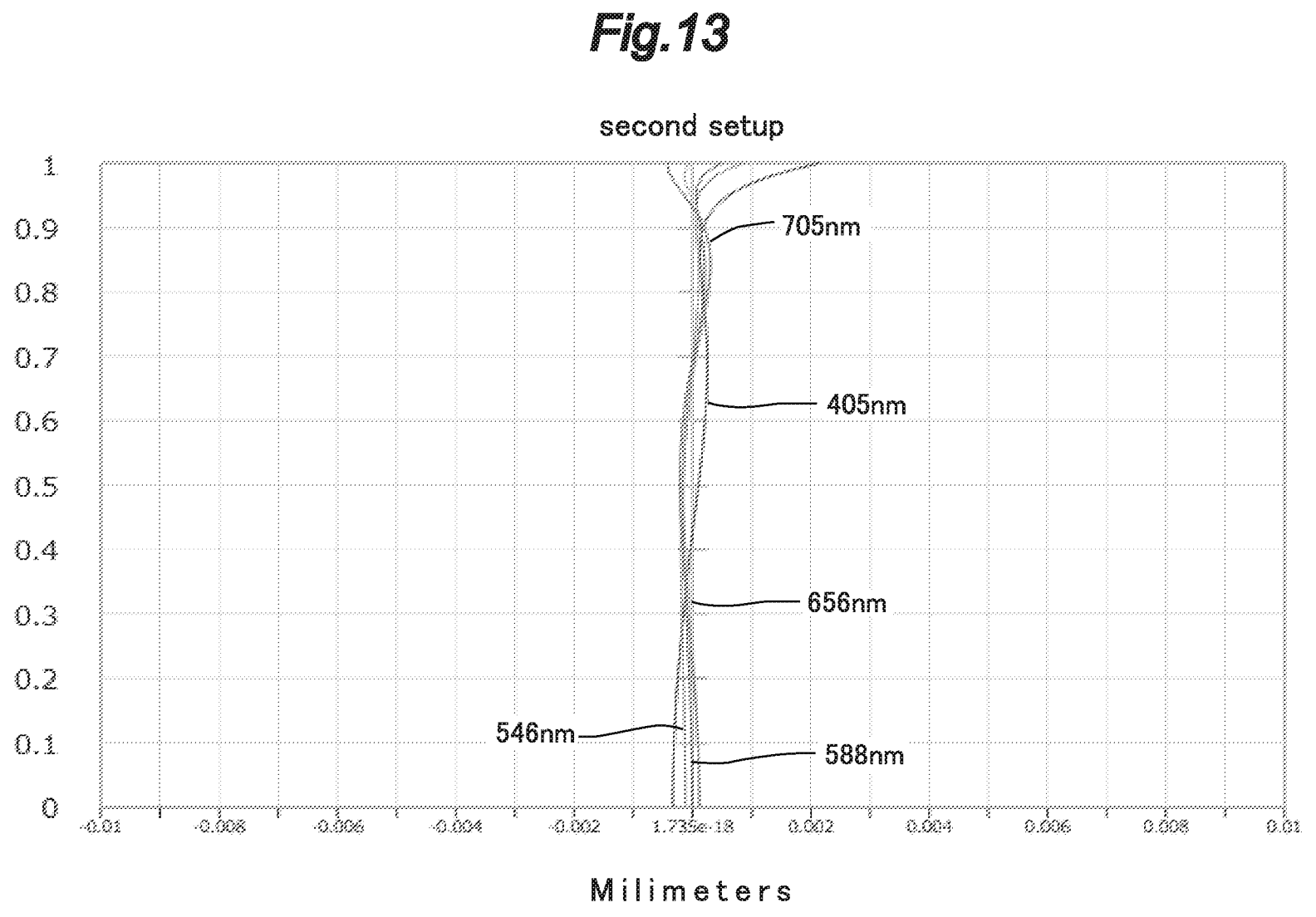

705nm
405nm
656nm
588nm
546nm 0.01
0.008
0.006
0.004
0.002
1.735e-18
-0.002
-0.004
-0.006
-0.008
-0.01

Millimeters 1
0.9
0.8
0.7
0.6
0.5
0.4
0.3
0.2
0.1
0 third setup
705nm
405nm
588nm
656nm
546nm
Millimeters
1
0.9
0.8
0.7
0.6
0.5
0.4
0.3
0.2
0.1
0

5
100
3
7
6
S
1
1
8
2
15
20
microscope controller
computer
22
23
objective lens correction controller
21

MICROSCOPE OBJECTIVE AND MICROSCOPE OBSERVATION SYSTEM

CROSS-REFERENCE TO RELATED APPLICATIONS

This application claims priority to Japanese Patent Application No. 2023-096802, filed on Jun. 13, 2023, which is incorporated herein by reference in its entirety for all purposes.

TECHNICAL FIELD

The present invention relates to a microscope objective and a microscope observation system having such an objective.

BACKGROUND ART

In life sciences and pharmaceutical industry, there has been reported increasing number of research using 3D cell culture such as spheroids or organoids. More recently, high-quality imaging from microscopes and screening systems has accelerated drug discovery and validation of the efficacy (see JP2022-78638A and JP2022-169853A).

When the depth of a sample is imaged with an inverted microscope, an immersion objective is adopted to prevent from spherical aberration occurrence due to the mismatch in refractive index. Various immersion objectives for such microscope observation are known from the prior art. (see JP2023-32561A, U.S. Pat. No. 7,349,162, Japanese Patent No. 6960487, and JPH5-196873A).

Additional key tool is a microplate, a container with multiple arrayed wells. It is also known as a microtiter plate, micro well plate or multiwell, and will be referred as "microplate" in this document. It is frequently used for high throughput screening allowing separately culturing cells under different experimental conditions. Such a microplate is disclosed in many documents, for example, JP2022-78638A.

Several issues should be taken into considerations when observing samples on a microplate, which is different from the observation of samples on a conventional coverslip.

First, most microplate are made of polymeric materials such as acrylic, polyethylene, polystyrene, and products thereof are available in a variety of shapes. These variations in the shape (especially, bottom thickness) of the microplates can result in unexpected imaging failures.

Additionally, polymeric products are molded, and the mold process parameters are not optimized to optical applications. Microplates made of polymeric materials, therefore, suffer from greater optical property variance compared to optical glass products.

(M. Bass, et al: Handbook of Optics vol. II, McGraw-Hill).

These variations in optical properties and thickness interferes sufficient image acquisition by disturbing spherical aberration and chromatic aberration (R. Kingslake: Lens Design Fundamentals, SPIE), From the aspect of an immersion objective, it is noteworthy that a plurality of immersion liquids is selectively adopted to the observation target. Each of immersion liquids has different refractive index and Abbe number, which means the balanced correction of spherical aberration and the chromatic aberration significantly depends on the selection of the immersion liquid.

Hereinafter, existing immersion objective will be described in consideration of the above issues.

JP2023-32561A discloses an objective that corrects the spherical aberration and the chromatic aberration by moving some lens groups along the optical axis corresponding to switching the immersion liquid such that at least one of the refractive index and the Abbe number thereof varies by 5% or more. However, in this method, the spherical aberration and the chromatic aberration are both corrected at the same time. Accordingly, precise correction can not be performed in switching between immersion liquid with equal refractive index but different Abbe number. Such a situation, for example, corresponds to switching between the immersion liquid A and the immersion liquid E listed in JP2023-32561A, but the correction method in this case is not disclosed therein.

U.S. Pat. No. 7,349,162 discloses an objective that achieves an appropriate configuration where aberrations are well-corrected by moving several lens groups according to the conditional change including thickness of a coverslip, temperature, and an immersion liquid. It is notable that this method moves all lens group simultaneously. Thus, only a few patterns anticipated at the time of design can be dealt with, others are discarded.

U.S. Pat. No. 6,960,487 discloses an objective that corrects the spherical aberration and the chromatic aberration by inserting or removing an appropriate parallel plane plate depending on an immersion liquid. However, this method can only be applied to a few of immersion liquid anticipated at the time of design. Besides, the change in optical properties of a sample container is not considered. Furthermore, it is necessary to secure the space to hold the parallel plane plate on the side of a sample, which leads to an increase in the length of the objective.

JPH5-196873A discloses an objective lens that corrects the aberrations by inserting or removing a correction lens depending on the presence or absence of a coverslip. However, this method can only deal with the discrete change between "with a coverslip" and "without a coverslip". This method, therefore, does not provide precise correction depending on the thickness variation of a coverslip.

SUMMARY OF THE INVENTION

In view of the background mentioned earlier, an object of the present invention is to provide a microscope objective that can exhibit sufficient imaging quality even under the condition including the change in immersion liquids and an optical property variation of the sample container.

To achieve such an object, one aspect of the present invention provides a microscope objective (1) comprising: a first movable lens group (A) that is movable along the optical axis; a first correction means (Ac) configured to move the first movable lens group along the optical axis; a second movable lens group (B) that is movable along the optical axis; and a second correction means (Bc) configured to move the second movable lens group along the optical axis.

According to this aspect, the first correction means and the second correction means can each correct different aberrations. Accordingly, it is possible to obtain the sufficient optical performance of the microscope objective under the conditions with product variability (thickness, optical property) of a sample container or plural selections of an immersion liquid.

In the above aspect, preferably, the first movable lens group (A) is composed of a cemented doublet with a plano-convex lens (A1) and a plano-concave lens (A2).

According to this aspect, it is possible to embody the first movable lens group with a simple lens configuration.

In the above aspect, preferably, the plano-convex lens (A1) and the plano-concave lens (A2) satisfy following conditional expressions (1) and (2).

$$|n_1 - n_2| < 0.05 \quad (1)$$

$$|v_1 - v_2| > 10 \quad (2)$$

$n_1$: refractive index of the plano-convex lens on a reference wavelength $n_2$: refractive index of the plano-concave lens on the reference wavelength $v_1$: Abbe number of the plano-convex lens $v_2$: Abbe number of the plano-concave lens According to this aspect, it is possible to further improve the optical performance of the microscope objective even under the conditions with product variability (thickness, optical property) of a sample container or plural selections of an immersion liquid.

To achieve such an object, one aspect of the present invention provides a microscope observation system (100) comprising: the microscope objective (1) including the first movable lens group (A), the first correction means (Ac), the second movable lens group (B), and the second correction means (Bc); an integrated workstation (20) configured to control the first correction means (Ac) and the second correction means (Bc) of the microscope objective; a tube lens unit (2) configured to form an image in combination with the microscope objective; and an image acquisition device (3) configured to acquire the image formed by the tube lens unit, wherein the integrated workstation is configured to calculate a correction amount from image data acquired by the image acquisition device, and control the first correction means and the second correction means based on the calculated correction amount.

According to this aspect, the first correction means can correct axial chromatic aberration, and the second correction means can correct spherical aberration. Accordingly, even under the conditions with product variability (thickness, optical property) of a sample container or plural selections of an immersion liquid, it is possible to improve the optical performance of the microscope objective.

Thus, according to the above aspects, it is possible to realize a microscope objective and a microscope observation system that can acquire preferable imaging quality by individually correcting spherical aberration and chromatic aberration even under the conditions with product variability (thickness, optical property) of a sample container or plural selections of an immersion liquid.

BRIEF DESCRIPTION OF THE DRAWING(S)

FIGS. 9A to 9C are graphs of a lateral aberration in the second setup of Example 1;

FIG. 13 is a graph of a longitudinal aberration in a second setup of Example 2;

DETAILED DESCRIPTION OF THE INVENTION

First, a microscope objective 1 according to an embodiment of the present invention will be described.

Figure 1:
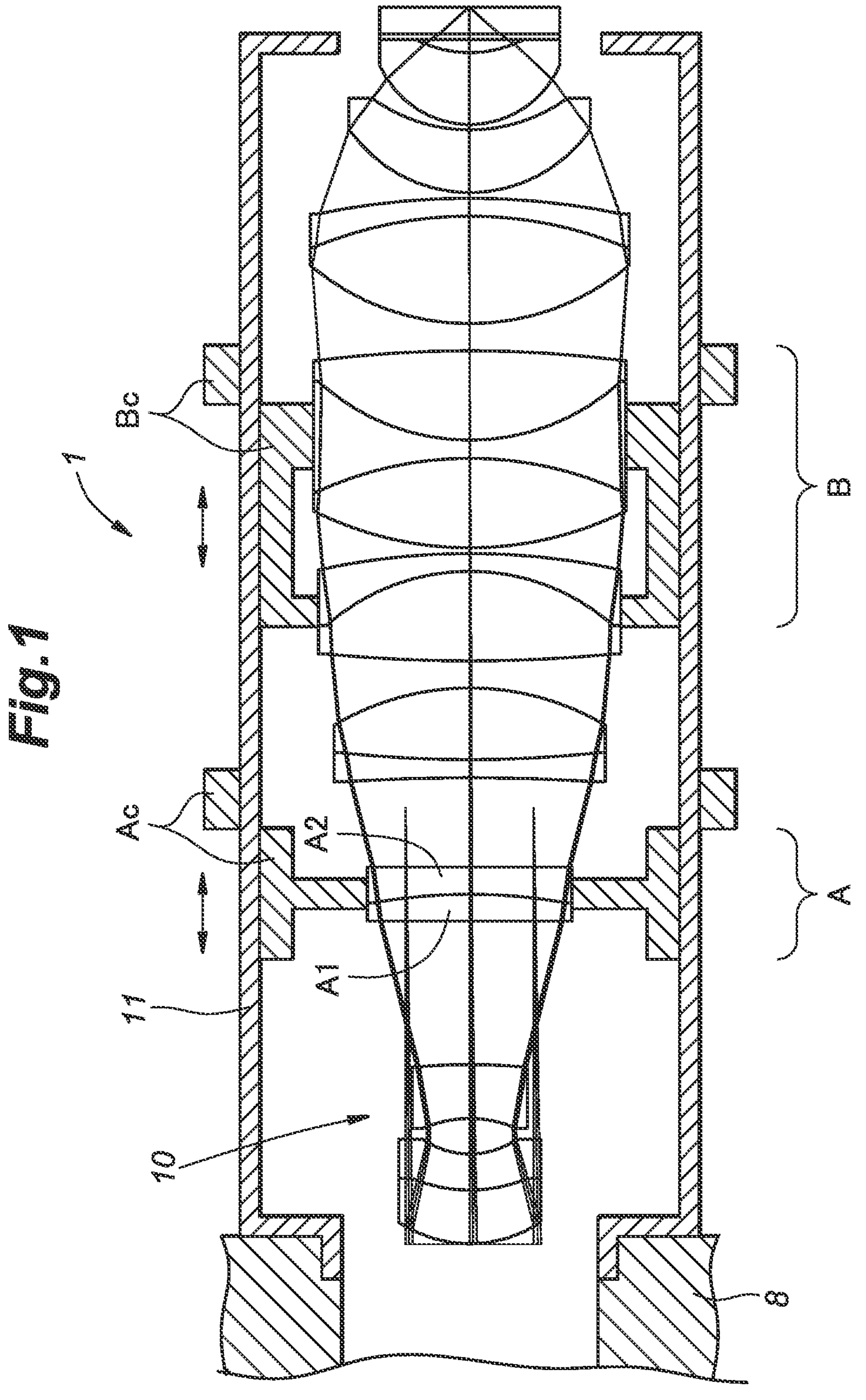
FIG. 1 is a configuration drawing showing a microscope objective according to the present embodiment.

As shown in FIG. 1, the microscope objective 1 includes an optical system 10 composed of a plurality of lenses that constitute an objective lens, and a lens barrel 11 that holds the optical system 10. The optical system 10 of the microscope objective 1 includes a first movable lens group A that is movable along the optical axis (see bidirectional arrows in FIG. 1). The microscope objective 1 can correct axial chromatic aberration by moving the first movable lens group A along the optical axis via a first correction means Ac. The first correction means Ac is an operating device that moves the first movable lens group A relative to the lens barrel 11.

Further, the optical system 10 of the microscope objective 1 includes a second movable lens group B that is movable along the optical axis. The microscope objective 1 can correct spherical aberration by moving the second movable lens group B along the optical axis via a second correction means Bc. The second correction means Bc is an operating device that moves the second movable lens group B relative to the lens barrel 11.

In this way, the microscope objective 1 includes two movable lens groups A and B, namely, the first movable lens group A that corrects the axial chromatic aberration and the second movable lens group B that corrects the spherical aberration respectively. The microscope objective 1 can separately correct the axial chromatic aberration and the spherical aberration by moving the individual movable lens groups A and B respectively. Accordingly, it is possible to realize flexible correction of the aberrations.

For example, the first correction means Ac and the second correction means Bc are each realized by (composed of) a correction collar. Alternatively, the first correction means Ac and the second correction means Bc may be each realized by (composed of) an electric actuator that drives each movable lens group A and B. In case of using the electric actuator, electromechanical control by a computer-aided microscope observation system allows more flexible aberration correction.

The first movable lens group A is composed of a cemented doublet with a plano-convex lens A1 and a plano-concave lens A2. The plano-convex lens A1 and the plano-concave lens A2 satisfy the following conditional expressions (1) and (2).

$$|n_1 - n_2| < 0.05 \quad (1)$$

$$|\nu_1 - \nu_2| > 10 \quad (2)$$

$n_1$: refractive index of the plano-convex lens A1 on the reference wavelength $n_2$: refractive index of the plano-concave lens A2 on the reference wavelength $\nu_1$: Abbe number of the plano-convex lens A1

$\nu_2$: Abbe number of the plano-concave lens A2

More preferably, the plano-convex lens A1 and the plano-concave lens A2 may satisfy the following conditional expressions (3) and (4).

$$|n_1 - n_2| < 0.01 \quad (3)$$

$$|\nu_1 - \nu_2| > 20 \quad (4)$$

The above conditional expressions represent that two types of glasses, whose refractive indexes on the reference wavelength is nearly equal but whose Abbe numbers are different, are cemented each other. This configuration allows selective control of the axial chromatic aberration.

In the following, it is assumed that the first movable lens group A moves along the optical axis so as to change the ray height of the light incident to A itself. On the reference wavelength, the first movable lens group A can be substantially regarded as a parallel plane plate, so the change of the ray height has no effect on the aberrations. However, on other wavelengths, the first movable lens group A has optical power, so the change in the ray height affects the axial chromatic aberration.

The method of correcting the aberrations according to the present embodiment will be described using examples.

Figure 2:
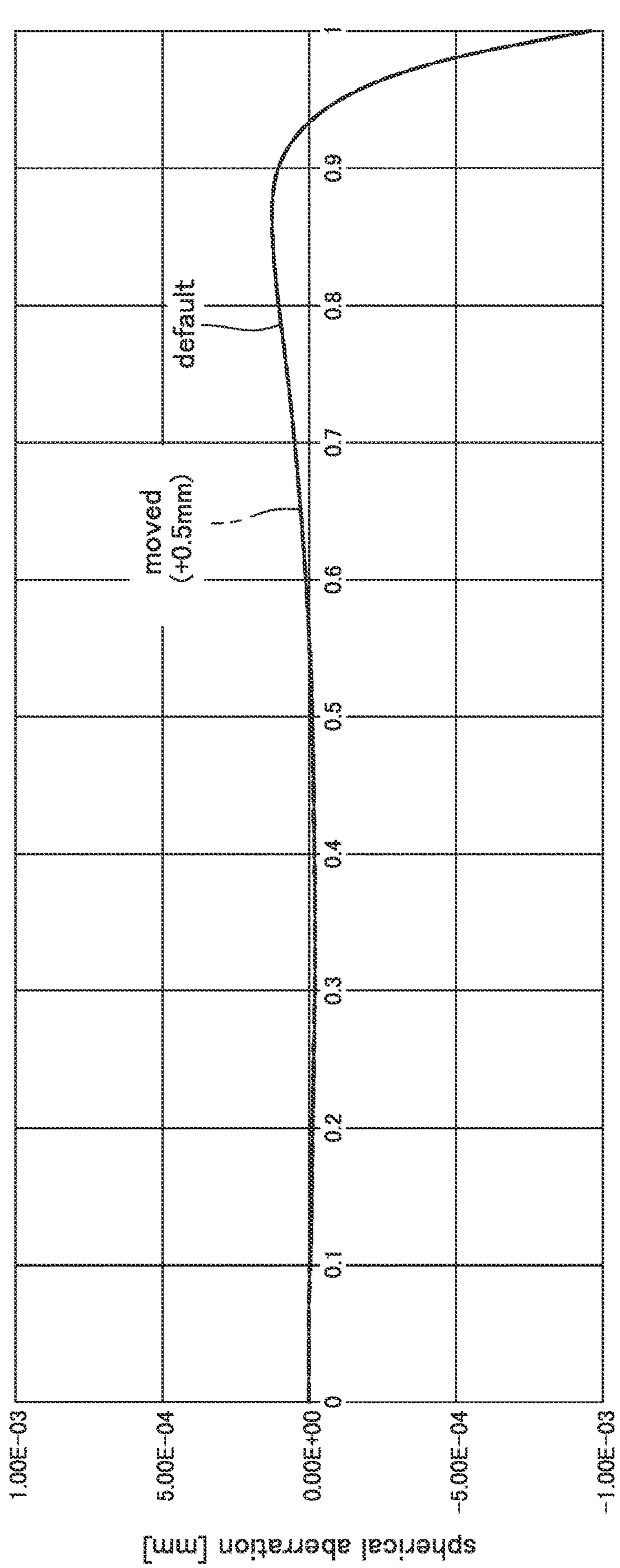
FIG. 2 is a graph showing spherical aberration on a reference wavelength in a default state and a moved state (a state where a first movable lens group moves from the default state) in a microscope objective of Example 1.

FIG. 2 shows the spherical aberration on the reference wavelength in a default setup and a moved setup (a state where the first movable lens group A travels from the default setup) in the microscope objective 1 of Example 1 which will be described later. As can be seen from FIG. 2, although the first movable lens group A travels, the spherical aberration on the reference wavelength is hardly affected.

Figure 3:
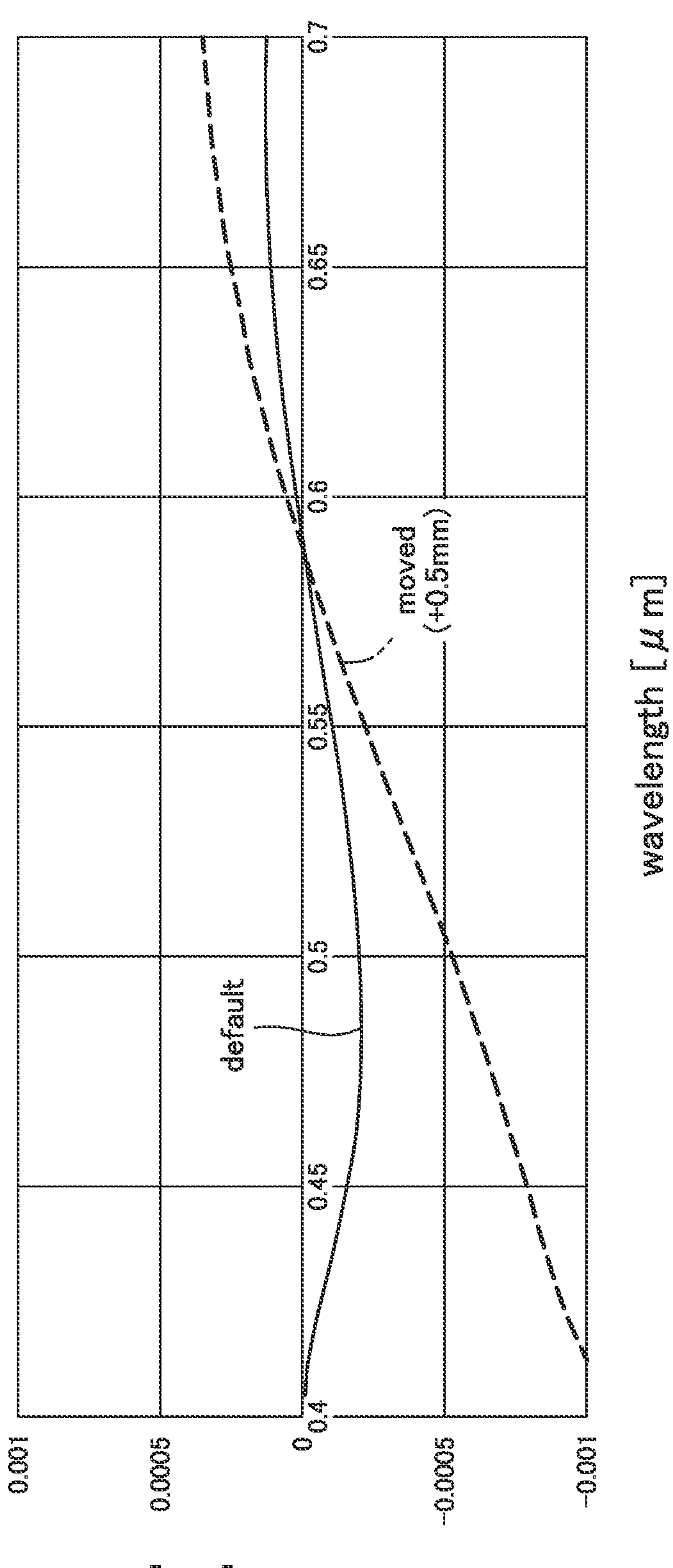
FIG. 3 is a focal shift vs wavelength plot showing the change on longitudinal chromatic aberration at a time when the first movable lens group moves from the default state in the microscope objective of Example 1.

FIG. 3 shows the effect on the chromatic aberration, or more specifically, the quantitative change in the axial chromatic aberration (focus shift) at a time when the first movable lens group A travels from the default setup in the microscope objective 1 of Example 1. FIG. 3 shows that the axial chromatic aberration changes significantly as the first movable lens group A travels.

As shown in FIGS. 2 and 3, operating the first movable lens group A enables the change of the axial chromatic aberration without significant change of the spherical aberration on the reference wavelength.

With the second lens group B having the function to correct the spherical aberration, the microscope objective 1 becomes capable of successful correcting both the spherical aberration and the axial chromatic aberration separately.

Next, a microscope observation method as another aspect of the present invention will be described.

Figure 25:
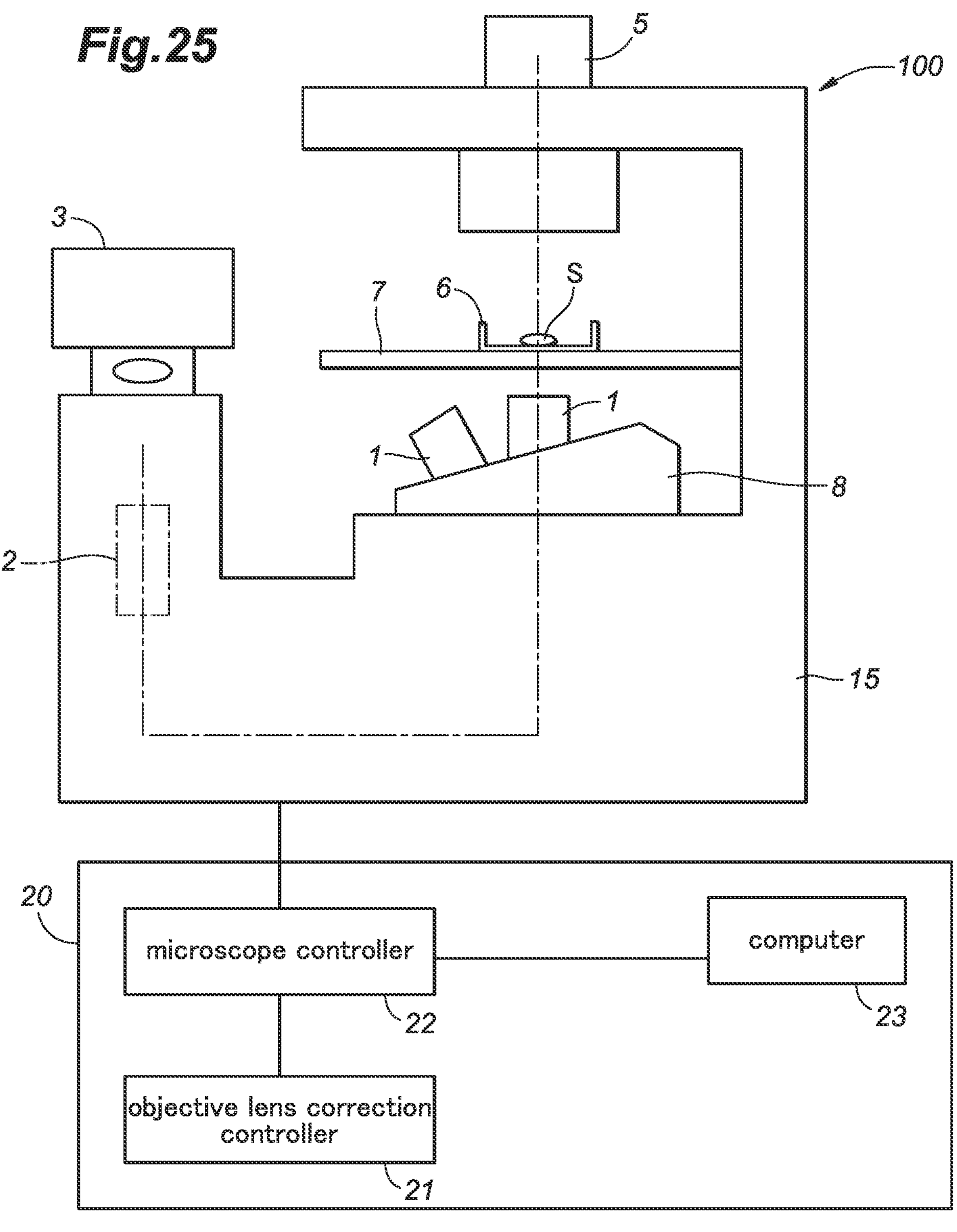
FIG. 25 is a configuration diagram of a microscope observation system of Example 4.

The microscope observation method is embodied by a microscope observation system illustrated in FIG. 25. The microscope observation system, the details of which will be described in Example 4, is a microscope observation system 100, and includes a microscope assembly 15 including at least one microscope objective 1, and an integrated workstation 20 configured to control the microscope assembly 15. The microscope assembly 15 further includes a tube lens unit 2 and an image acquisition device 3. Further, the microscope objective 1 includes the first correction means Ac (see FIG. 1) that corrects the axial chromatic aberration, and the second correction means Bc (see FIG. 1) that corrects the spherical aberration.

The integrated workstation 20 includes an objective lens correction controller 21, a microscope controller 22, and a computer 23. The computer 23 calculates a residual aberration amount based on the image data acquired by the image acquisition device 3. At this time, a test pattern and the like may be used as an observation target. The computer 23 calculates the defocus and the residual aberration from the image, and the objective lens correction controller 21 gets the movement amount of each movable lens group A and B from the calculation results. The integrated workstation 20 operates the first correction means Ac and the second correction means Bc via the microscope controller 22. Accordingly, it is possible to get to a preferred setup where sufficient imaging quality is exhibited.

In this way, according to the present embodiment, it is possible to realize the microscope objective 1 and the microscope observation system 100 that can acquire sufficient images by separately correcting the spherical aberration and the chromatic aberration even under the conditions with a significant imaging configuration variance that is caused by product variability (mechanical thickness, optical property) of a container on which a sample is placed or plural selections of immersion liquid.

In the following, a plurality of examples according to the microscope objective 1 of the present embodiment will be described. FIGS. 4 to 10C and Tables 1 to 4 show Example 1, FIGS. 11 to 17C and Tables 5 to 8 show Example 2, FIGS. 18 to 24C and Tables 9 to 12 show Example 3, and FIG. 25 shows Example 4.

Tables 1, 5, and 9 show the lens data of the optical system of microscope objective 1. Tables 2, 6, and 10 show the prescription data such as a focal length of the microscope objective 1. Unless otherwise specified, specifications are shown using values on the reference wavelength. Tables 3, 7, and 11 show immersion liquid data of each immersion liquid used for the microscope objective 1. The immersion liquid data shows refractive index and Abbe number of each immersion liquid. Tables 4, 8, and 12 show variable distance data of the microscope objective 1. The variable distance data shows the values of variable distances in the first to third setups.

Further, regarding all the values of the following specifications, the focal length, the surface radius, the thickness, and the other parameters will be expressed using a unit of "millimeters (mm)" unless otherwise specified. In an optical system, equivalent optical performance can be acquired by proportional enlargement and proportional reduction. Accordingly, the present invention is not limited by the above unit.

Example 1

Figure 4:
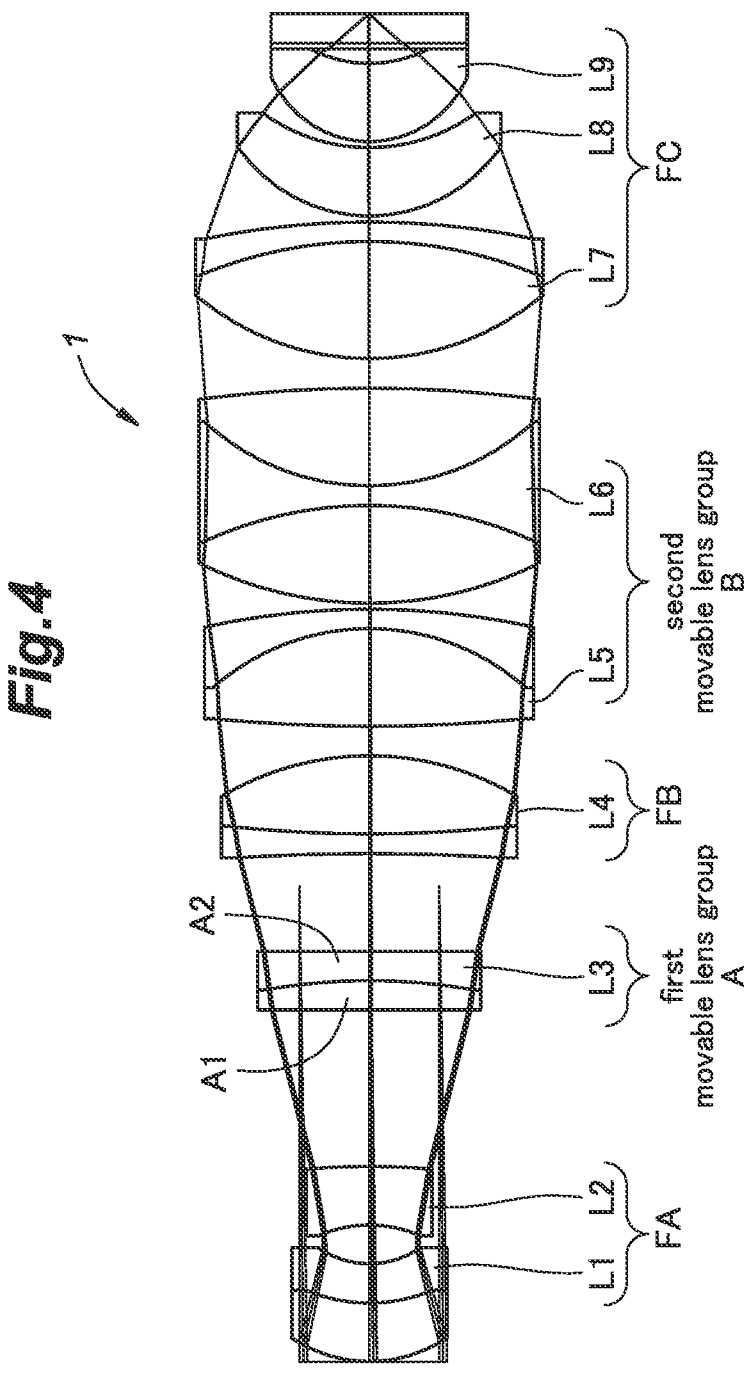
FIG. 4 is a cross-section view of an optical system of Example 1.
Figure 5:
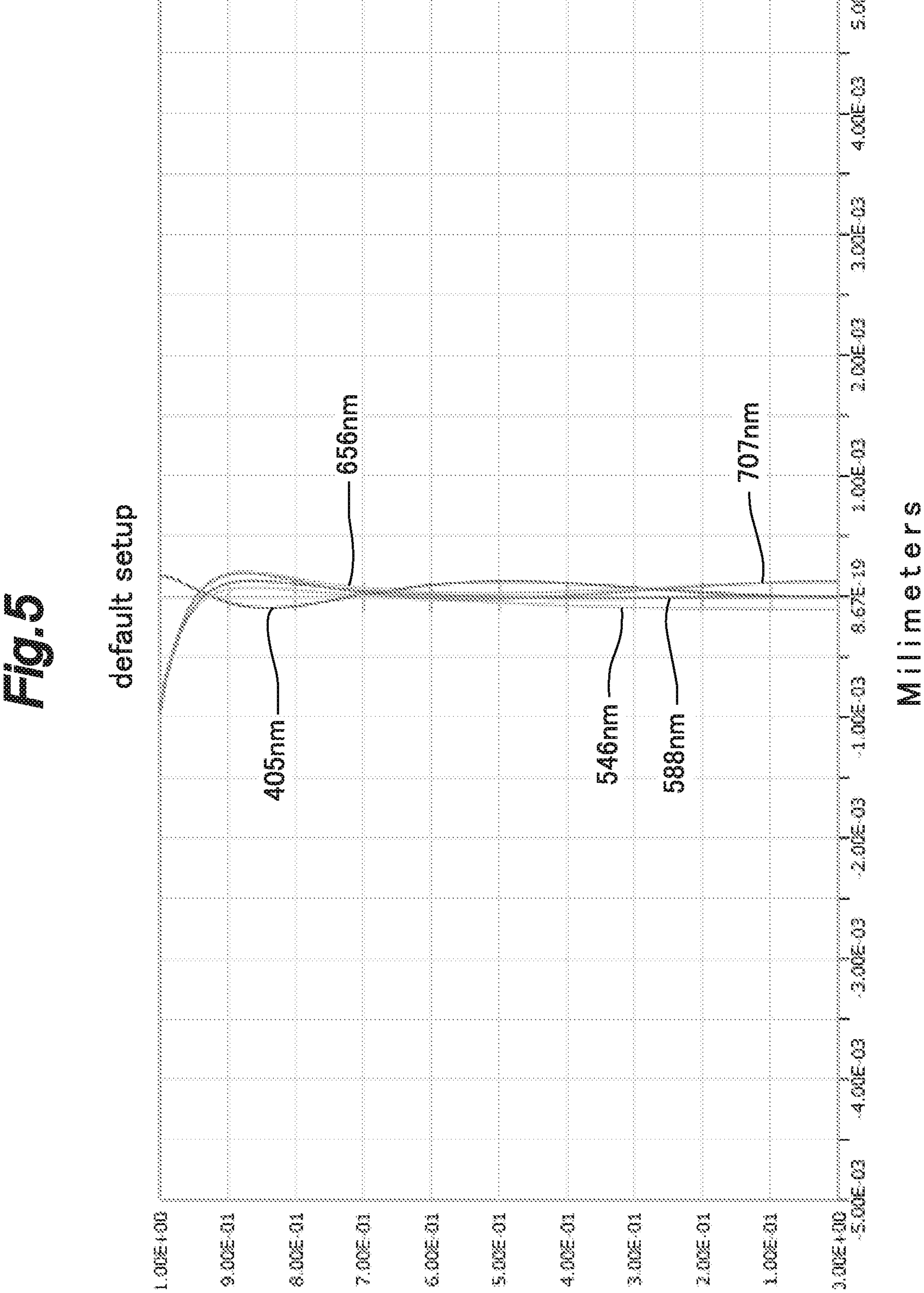
FIG. 5 is a graph of a longitudinal aberration in a first setup of Example 1.
Figure 6:
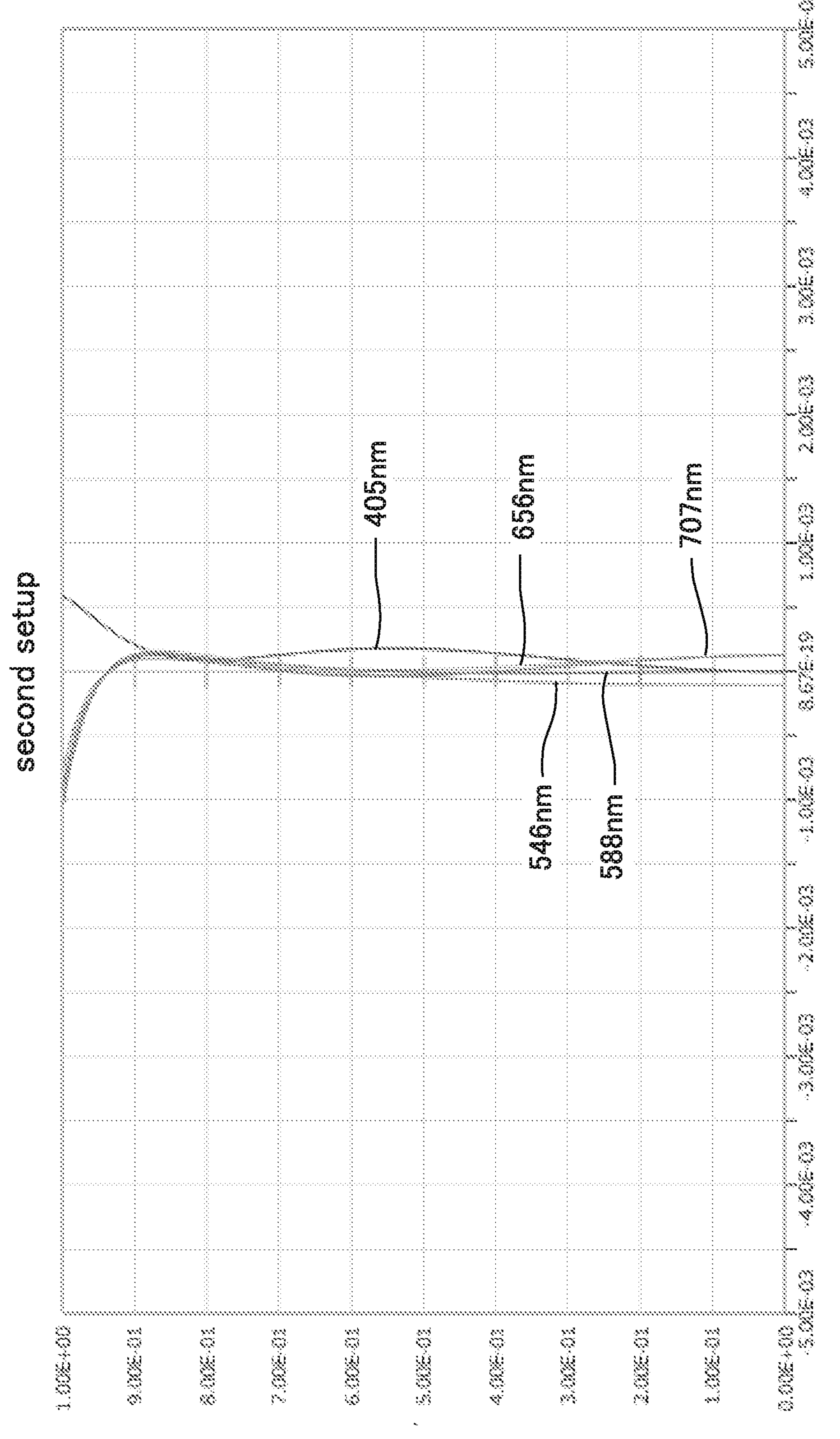
FIG. 6 is a graph of a longitudinal aberration in a second setup of Example 1.
Figure 7:
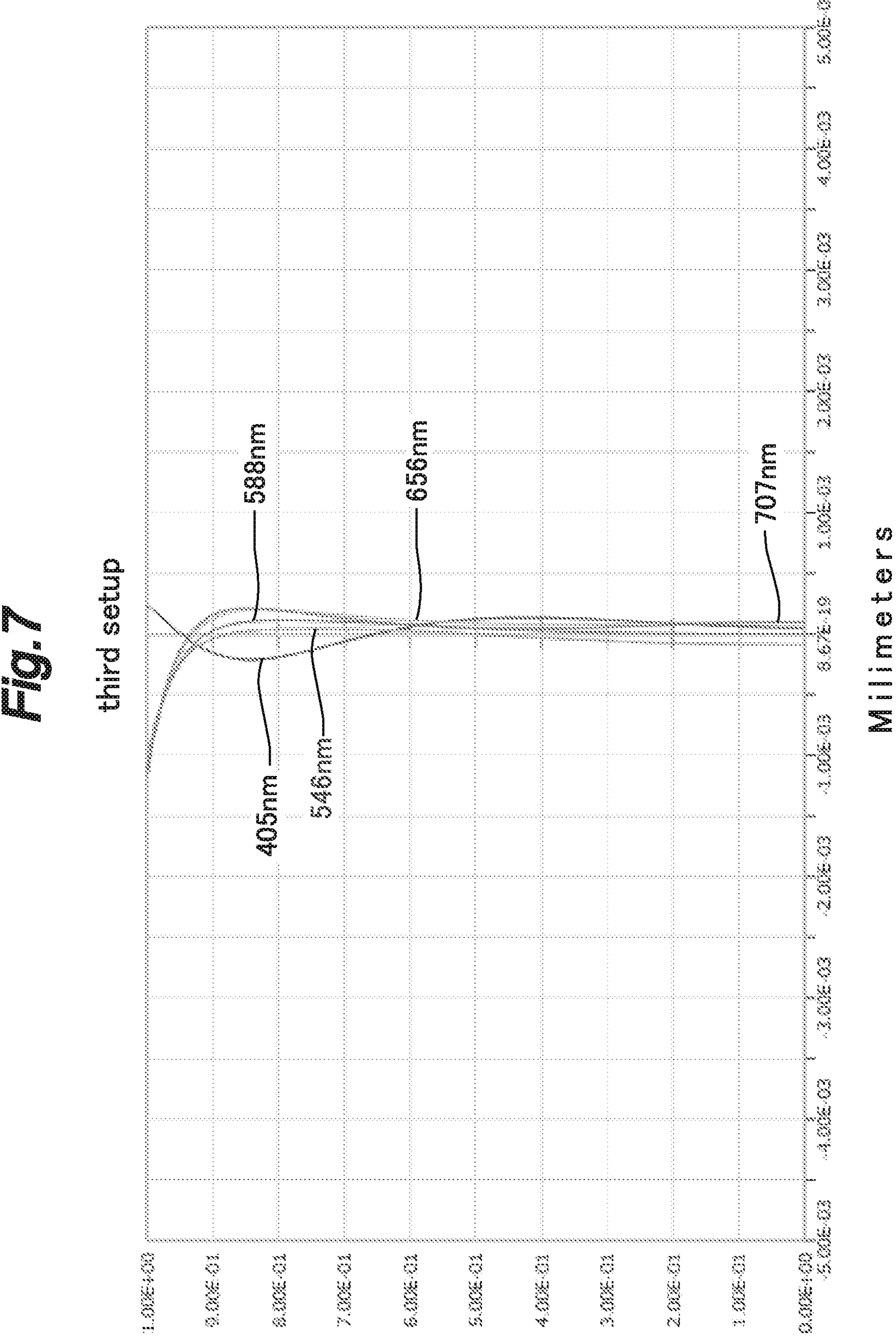
FIG. 7 is a graph of a longitudinal aberration in a third setup of Example 1.
Figure 8A:
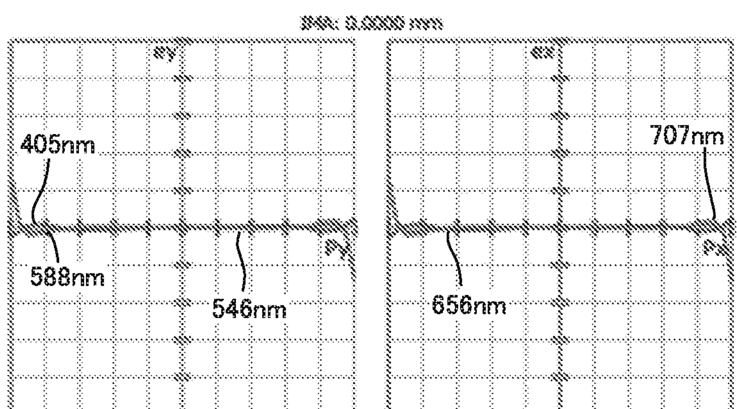
FIGS. 8A to 8C are graphs of a lateral aberration in the first setup of Example 1.
Figure 8B:
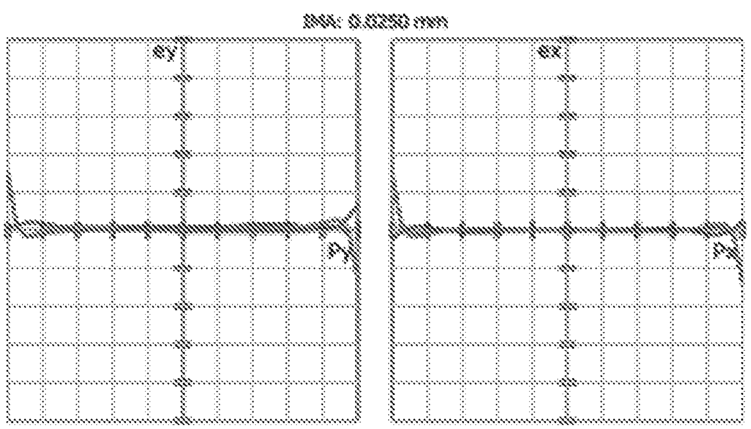
Figure 8C:
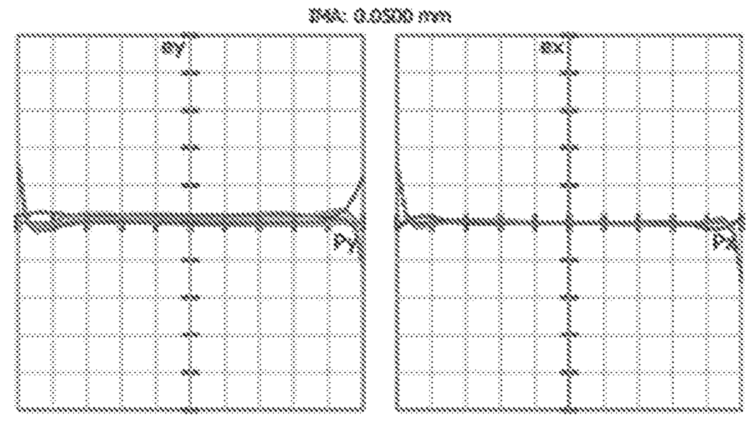
Figure 10A:
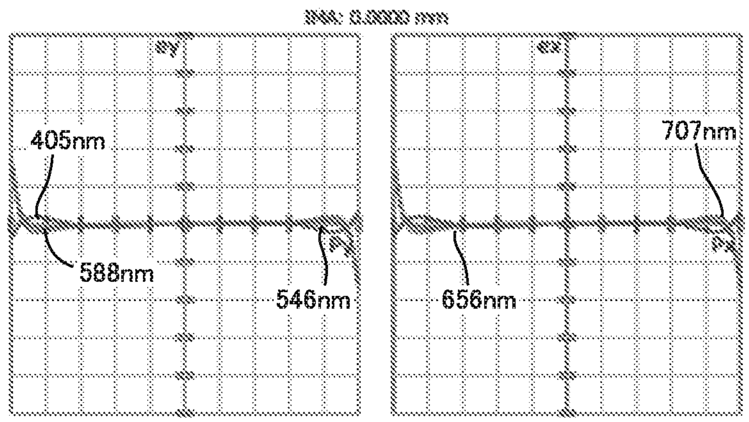
FIGS. 10A to 10C are graphs of a lateral aberration in the third setup of Example 1.
Figure 10B:
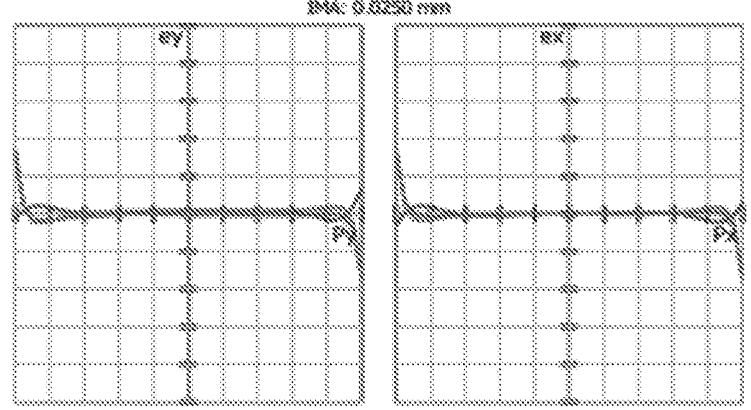
Figure 10C:
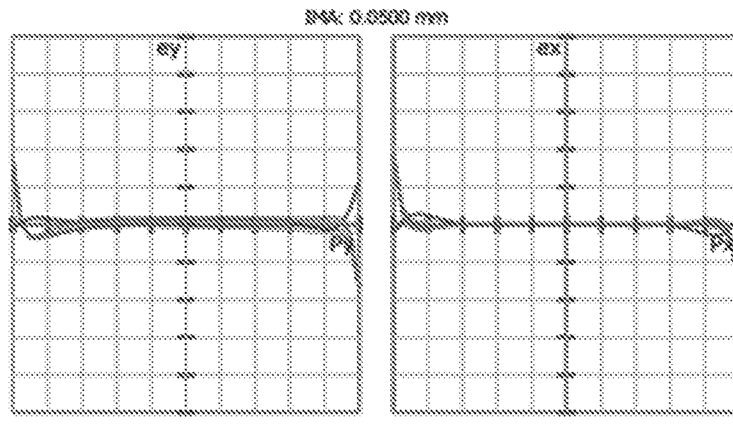

FIG. 4 is a cross-section view of an optical system in a microscope objective 1 of Example 1. FIGS. 5 to 7 are graphs of longitudinal aberration of the microscope objective 1 in the first (default) to third setups, respectively. FIGS. 8A to 8C, 9A to 9C, and 10A to 10C are graphs of lateral aberration of the microscope objective 1 in the first (default) to third setups, respectively.

The microscope objective 1 of Example 1 includes a first fixed lens group FA, a first movable lens group A, a second fixed lens group FB, a second movable lens group B, and a third fixed lens group FC. The first fixed lens group FA is composed of a plurality of lens components (a first lens component L1 (a cemented lens) and a second lens component L2 (a single lens) each formed of a concave meniscus lens) including a cemented lens. In this specification, "lens component" represents either a cemented element or a single lens. The first movable lens group A is composed of a cemented doublet (a third lens component L3) with a plano-convex lens A1 and a plano-concave lens A2. The second fixed lens group FB is composed of a cemented doublet (a fourth lens component LA). The second movable lens group B is composed of two cemented elements (a doublet L5 and a triplet L6). The third fixed lens group FC is composed of a plurality of lens components (a seventh lens component L7, and an eighth lens component L8 and a ninth lens component L9) including cemented elements.

The second movable lens group B can travel along the optical axis. The movable lens group where the high marginal ray traverses works more effectively to correct spherical aberration.

Further, the light beam emitted from the second movable lens group B is nearly afocal. This configuration makes it possible to suppress the change in the axial chromatic aberration when the second movable lens group B travels.

The first correction means Ac operates the first movable lens group A along the optical axis. Further, the second correction means Bc operates the second movable lens group B to move along the optical axis.

An observation target is placed on a polystyrene microplate. FIG. 4, which is a schematic view of the optical system, only shows the bottom of a well thereof.

An immersion liquid is applied to the gap between the microplate and the microscope objective 1.

In the first (default) setup, microplate with prescribed thickness and a prescribed immersion liquid are used. The reference wavelength is d-line. In the second setup, different immersion liquid from the first setup is used. Further, in the third setup, the thickness of the microplate (polystyrene) is different from that of the second setup.

The lens data of Example 1 is shown in the following Table 1. All glass materials starting with "S-" in Table 1 are names of glass manufactured by OHARA INC. Further, "POLYSTYR" indicates polystyrene.

TABLE 1

| surface number | radius of curvature [mm] | distance [mm] | material |
|---|---|---|---|
| 0 | Infinity | Infinity | |
| 1 | Infinity | 24.3053 | |
| 2 | Infinity | −24.3053 | |
| 3 | 7.030925 | 3.0000 | S-NPH1W |
| 4 | 8.191009 | 2.0000 | S-BSM25 |
| 5 | 4.548629 | 2.0000 | |
| 6 | −6.384699 | 3.0000 | S-LAH60 |
| 7 | −35.074601 | d(7) | |
| 8 | Infinity | 1.5000 | S-TIH13 |
| 9 | −30.000000 | 1.5000 | S-LAL61 |
| 10 | Infinity | d (10) | |
| 11 | −103.701768 | 1.0000 | S-NBH51 |
| 12 | 66.391333 | 4.0000 | $CaF_2$ |
| 13 | −14.754377 | d(13) | |
| 14 | 81.574927 | 5.0000 | $CaF_2$ |
| 15 | −12.066221 | 1.0000 | S-NBH5 |
| 16 | −38.717649 | 0.3000 | |
| 17 | 19.406258 | 5.0000 | $CaF_2$ |
| 18 | −20.266939 | 1.0000 | S-NBM51 |
| 19 | 12.458859 | 5.0000 | $CaF_2$ |
| 20 | −65.806008 | d(20) | |
| 21 | 13.730482 | 6.0000 | $CaF_2$ |
| 22 | −22.556592 | 1.0000 | S-TIM8 |
| 23 | −40.827426 | 0.3000 | |
| 24 | 8.164684 | 3.5000 | S-LAH60 |
| 25 | 9.252856 | 0.3000 | |
| 26 | 5.444674 | 4.0000 | S-LAH58 |
| 27 | 6.485100 | 0.7484 | SILICA |
| 28 | Infinity | d(28) | immersion liquid |
| 29 | Infinity | d(29) | POLYSTYR |
| 34 | Infinity | — | — |

TABLE 2

| | |
|---|---|
| NA | 1.2 |
| focal distance[mm] | 3.0 |
| field of view Y | 0.05 |

TABLE 3

| | immersion liquid A | immersion liquid B |
|---|---|---|
| refractive index | 1.43906 | 1.43906 |
| Abbe number | 55.5 | 52.67 |

TABLE 4

| | first state | second state | third state |
|---|---|---|---|
| | immersion liquid | | |
| | immersion liquid A | immersion liquid B | immersion liquid B |
| thickness of polystyrene d(29) | 1.500 | 1.500 | 1.550 |
| distance d(7) | 8.000 | 8.150 | 7.950 |
| distance d(10) | 5.000 | 4.850 | 5.050 |
| distance d(13) | 1.500 | 1.500 | 1.100 |
| distance d(20) | 1.500 | 1.500 | 1.900 |
| d(28) | 0.2998 | 0.2998 | 0.2587 |

FIGS. 5 to 7 are graphs of longitudinal aberration of the microscope objective 1 in the first to third setups of Example 1, respectively. FIGS. 8A to 8C, 9A to 9C, and 10A to 10C are graphs of lateral aberration of the microscope objective 1 in the first to third setups of Example 1, respectively.

Example 2

Figure 11:
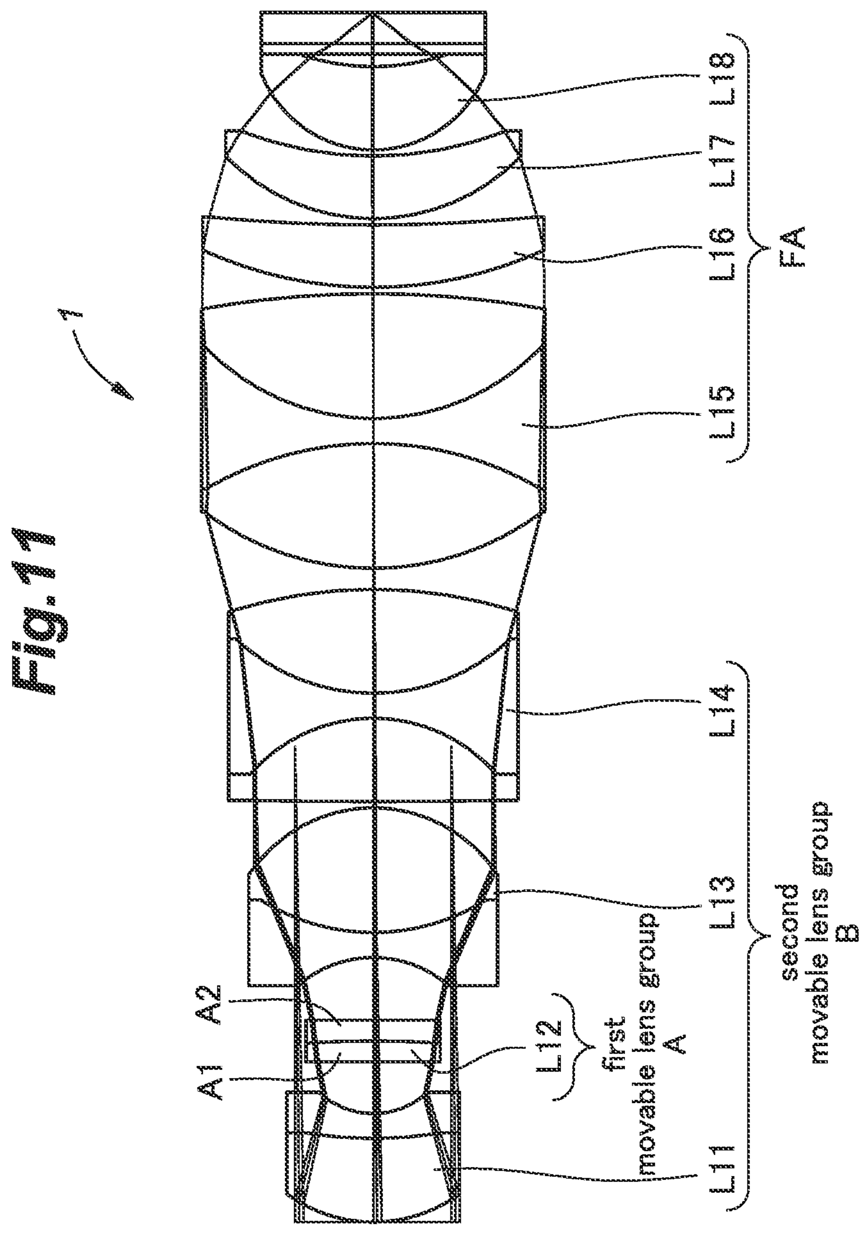
FIG. 11 is a cross-section view of an optical system of Example 2.
Figure 12:
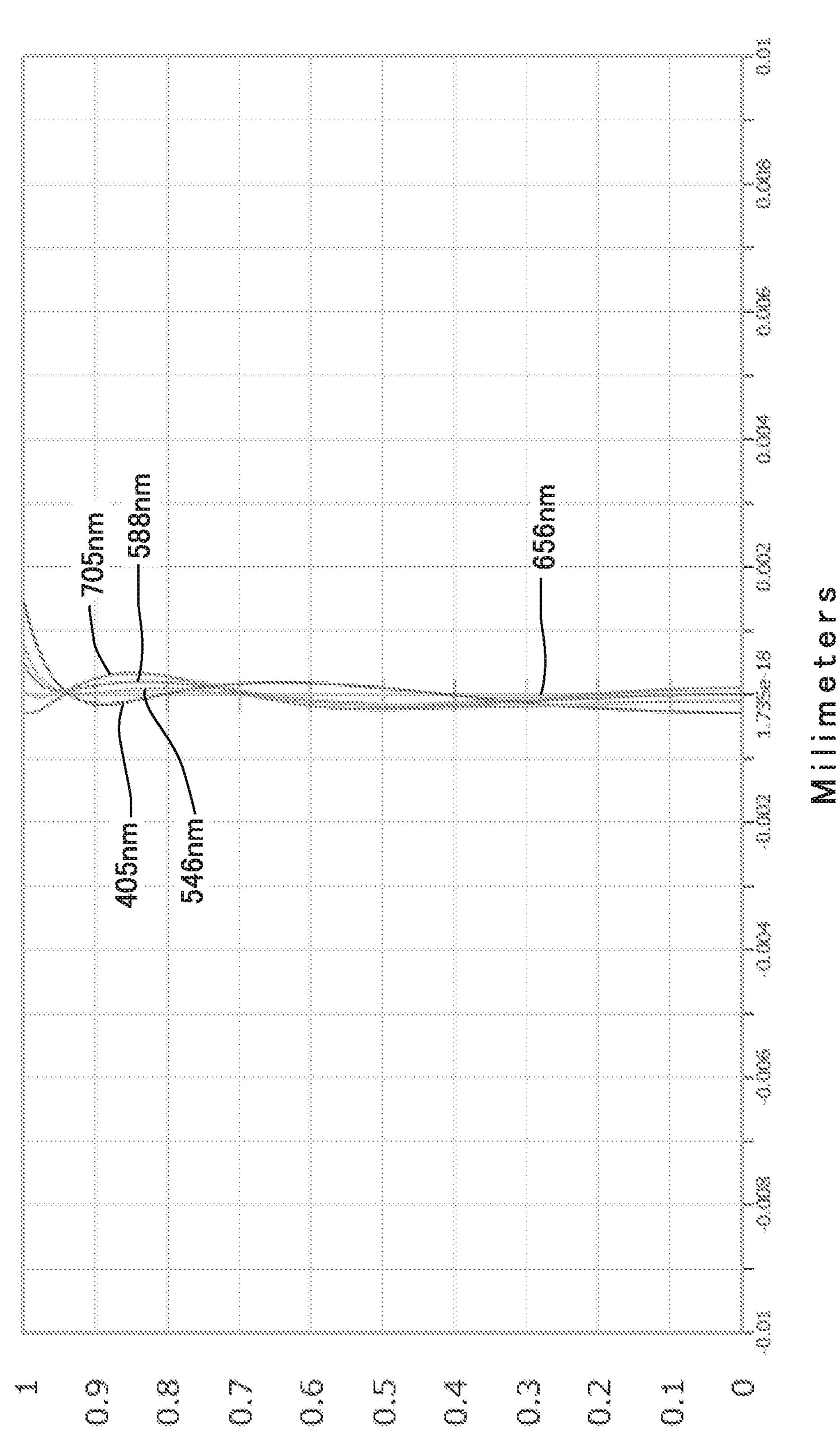
FIG. 12 is a graph of a longitudinal aberration in a first setup of Example 2.
Figure 14:
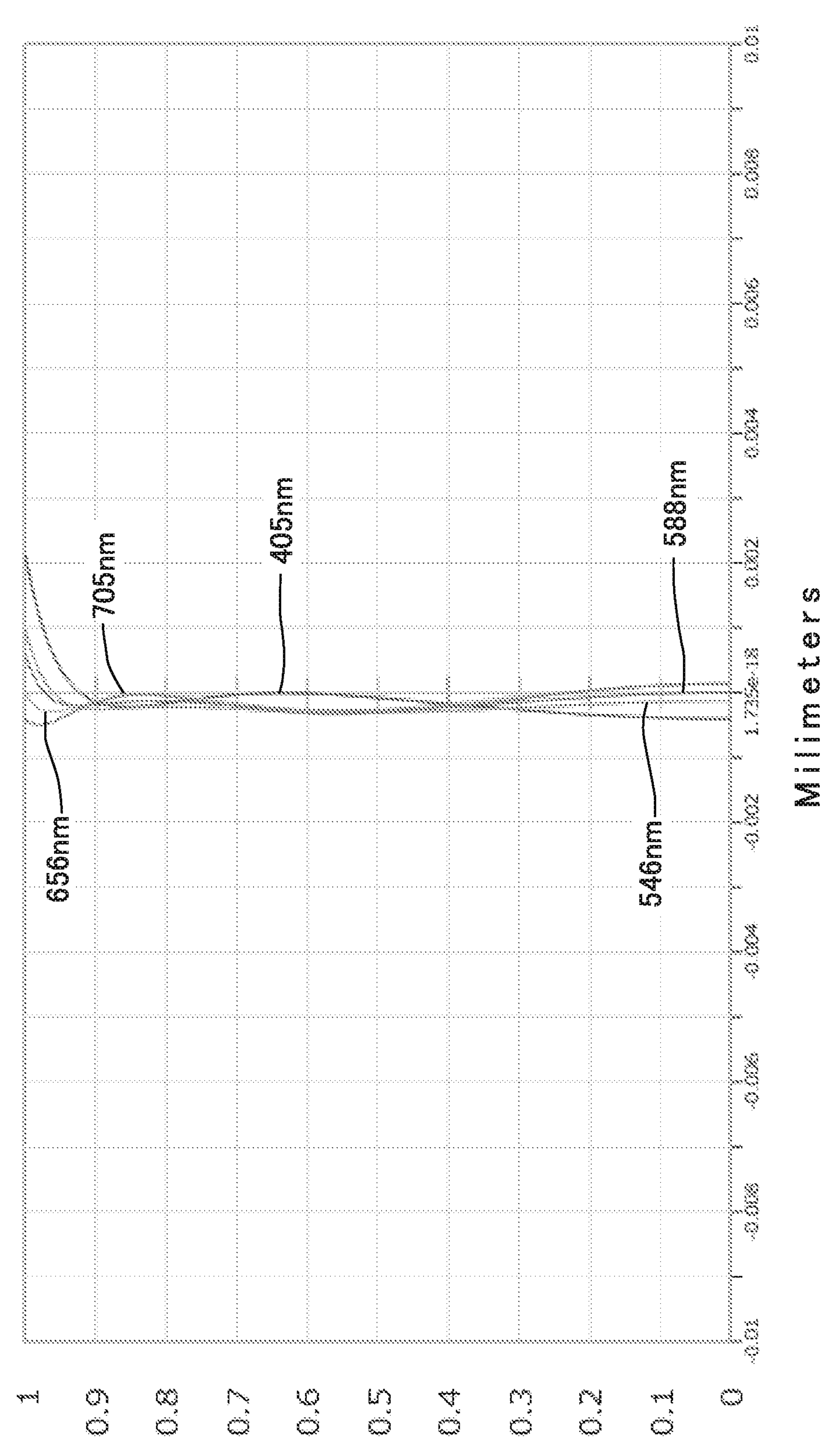
FIG. 14 is a graph of a longitudinal aberration in a third setup of Example 2.
Figure 15A:
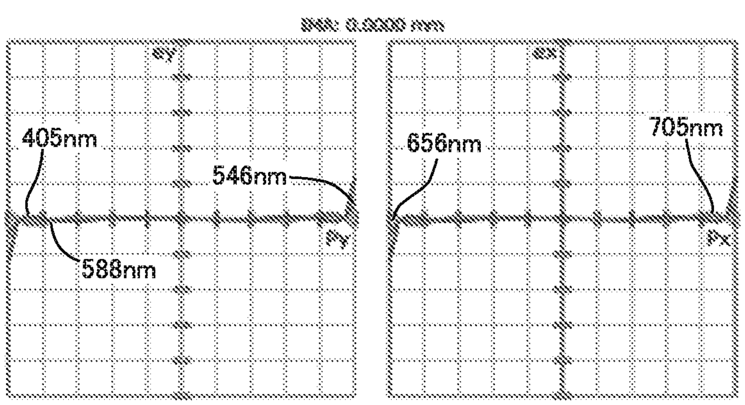
FIGS. 15A to 15C are graphs of a lateral aberration in the first setup of Example 2.
Figure 15B:
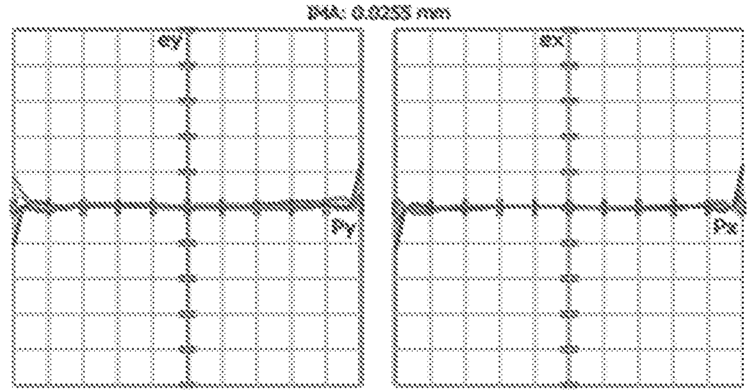
Figure 15C:
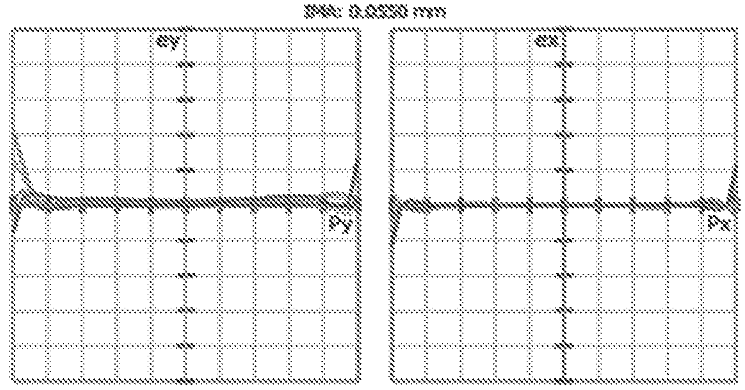
Figure 16A:
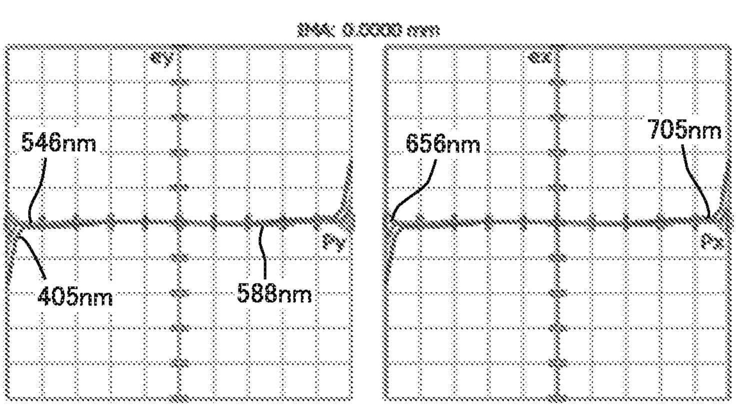
FIGS. 16A to 16C are graphs of a lateral aberration in the second setup of Example 2.
Figure 16B:
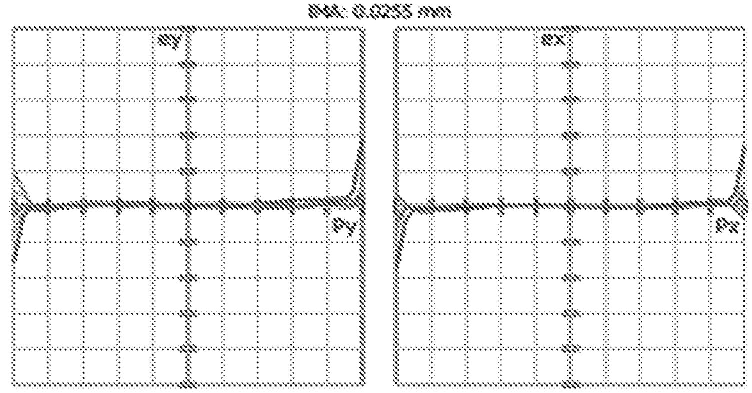
Figure 16C:
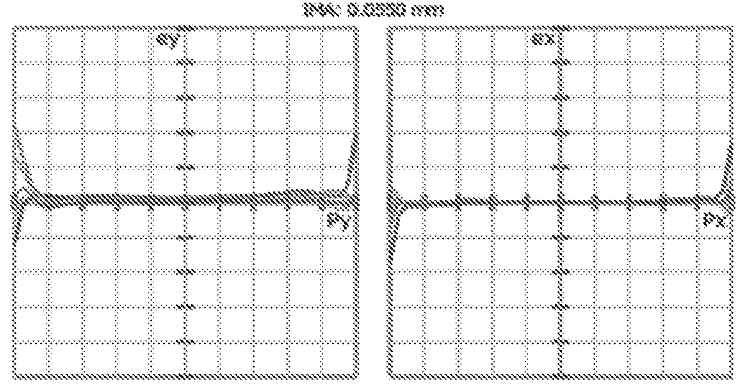
Figure 17A:
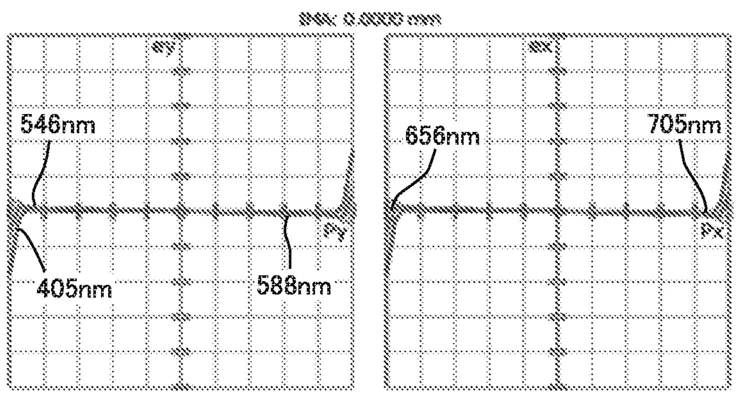
FIGS. 17A to 17C are graphs of a lateral aberration in the third setup of Example 2.
Figure 17B:
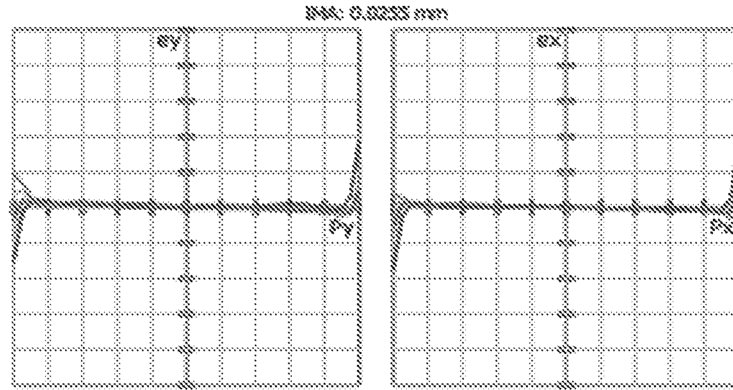
Figure 17C:
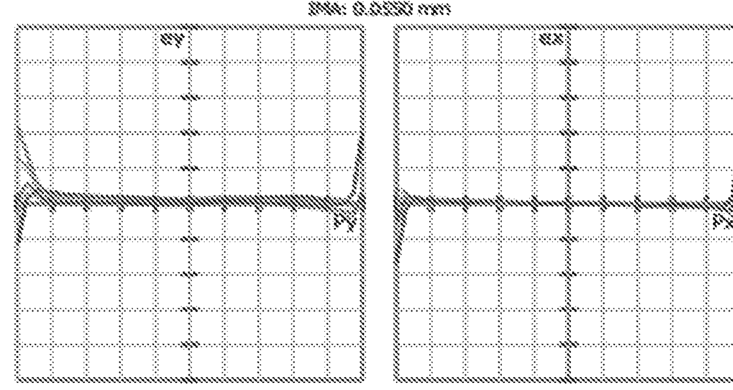

FIG. 11 is a cross-section view of an optical system in a microscope objective 1 of Example 2. FIGS. 12 to 14 are graphs of longitudinal aberration of the microscope objective 1 in the first (default) to third setups, respectively. FIGS. 15A to 15C, 16A to 16C, and 17A to 17C are graphs of lateral aberration of the microscope objective 1 in the first (default) to third setups, respectively.

The microscope objective 1 of Example 2 includes a second movable lens group B and a first fixed lens group FA. A first movable lens group A is configured inside of the second movable lens group B. As the second movable lens group B travels along the optical axis, the first movable lens group A travels together with the second movable lens group B.

The second movable lens group B is composed of four cemented elements (a doublet L11, a doublet L12, a doublet L13, and a triplet L14). The first movable lens group A is composed of a cemented doublet (the twelfth lens component L12) with a plano-convex lens A1 and a plano-concave lens A2. The first fixed lens group FA is composed of a plurality of lens components (a fifteenth lens component L15, and a sixteenth lens component L16, a seventeenth lens component L17, and an eighteenth lens component L18) including cemented elements.

When the first movable lens group A travels along the optical axis to correct the axial chromatic aberration, the second movable lens group B remains stationary.

The first correction means Ac operates the first movable lens group A to move along the optical axis. Further, the second correction means Bc operates the second movable lens group B to move along the optical axis.

The first movable lens group A is composed of a cemented doublet with the plano-convex lens A1 and the plano-concave lens A2.

An observation target is placed on a polystyrene microplate. FIG. 11, which is a schematic view of the optical system, only shows the bottom of a well thereof.

An immersion liquid is applied to the gap between the microplate and the microscope objective 1.

In the first (default) setup, microplate with prescribed thickness and a prescribed immersion liquid are used. The reference wavelength is d-line. In the second setup, different immersion liquid from the first setup is used. Further, in the third setup, the thickness of the microplate (polystyrene) is different from that of the second setup.

The lens data of Example 2 is shown in the following Table 5. All glass materials starting with "S-" in Table 5 are names of glass manufactured by OHARA INC. Further, "POLYSTYR" indicates polystyrene.

TABLE 5

| surface number | radius of curvature [mm] | distance [mm] | material |
|---|---|---|---|
| 0 | Infinity | Infinity | |
| 1 | Infinity | 22.8300 | |
| 2 | Infinity | −22.8300 | |
| 3 | 7.036377 | 4.0000 | S-NPH1W |
| 4 | 18.732970 | 1.2000 | S-LAH58 |
| 5 | 3.811779 | d(5) | |
| 6 | Infinity | 1.0000 | S-LAL61 |
| 7 | −50.000000 | 1.0000 | S-TIH13 |
| 8 | Infinity | d(8) | |
| 9 | −5.539968 | 1.2000 | S-NBM51 |
| 10 | 10.092859 | 6.0000 | S-FPM2 |
| 11 | −7.156434 | 0.3000 | |
| 12 | 327.493179 | 4.0000 | $CaF_2$ |
| 13 | −7.854974 | 1.2000 | S-NBM51 |
| 14 | 9.616101 | 5.0000 | $CaF_2$ |
| 15 | −22.499656 | d(15) | |
| 16 | 13.492090 | 6.0000 | $CaF_2$ |
| 17 | −15.888563 | 1.2000 | S-NBH5 |
| 18 | 11.224524 | 6.0000 | S-FPM2 |
| 19 | −46.482324 | 0.3000 | |
| 20 | 19.625396 | 3.0000 | S-LAH66 |
| 21 | 80.672096 | 0.3000 | |
| 22 | 9.862183 | 3.0000 | S-LAH58 |
| 23 | 17.250345 | 0.3000 | |
| 24 | 5.775999 | 4.0000 | S-LAH58 |
| 25 | 10.777172 | 0.6084 | SILICA |
| 26 | Infinity | d(26) | immersion liquid |
| 27 | Infinity | d(27) | POLYSTYR |
| 28 | Infinity | — | — |

TABLE 6

| | |
|---|---|
| NA | 1.25 |
| focal distance[mm] | 3.0 |
| field of view Y | 0.055 |

TABLE 7

| | immersion liquid A | immersion liquid B |
|---|---|---|
| refractive index | 1.43906 | 1.43906 |
| Abbe number | 55.5 | 52.67 |

TABLE 8

| | first state | second state | third state |
|---|---|---|---|
| | immersion liquid | | |
| | immersion liquid A | immersion liquid B | immersion liquid B |
| thickness of polystyrene(d27) | 1.5000 | 1.5000 | 1.5200 |
| d(5) | 2.5000 | 1.5000 | 2.0000 |
| d(8) | 3.0000 | 4.0000 | 3.5000 |
| d(15) | 1.0000 | 1.0000 | 1.0700 |
| d(26) | 0.4962 | 0.4964 | 0.4766 |

FIGS. 12 to 14 are graphs of longitudinal aberration of the microscope objective 1 in the first to third setups of Example 2, respectively. FIGS. 15A to 15C, 16A to 16C, and 17A to 17C are graphs of lateral aberration of the microscope objective 1 in the first to third setups of Example 2, respectively.

Example 3

Figure 18:
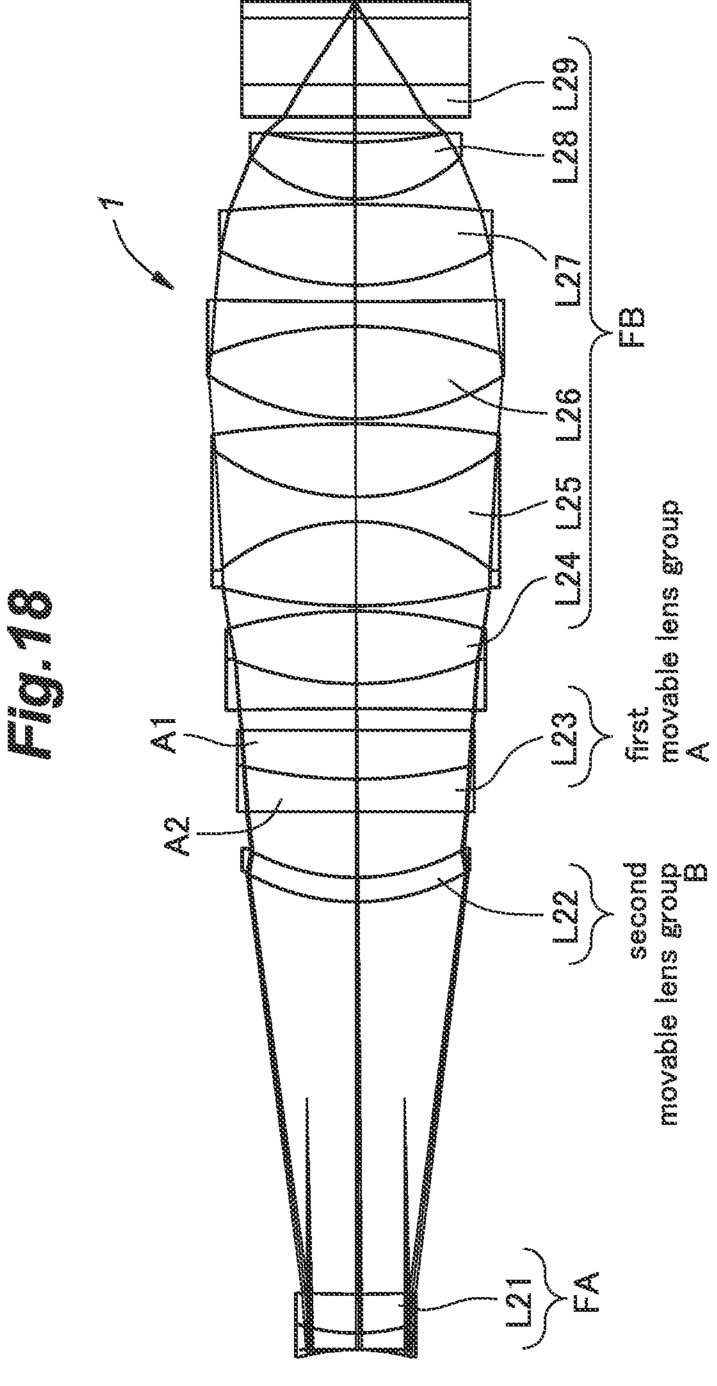
FIG. 18 is a cross-section view of an optical system of Example 3.
Figure 19:
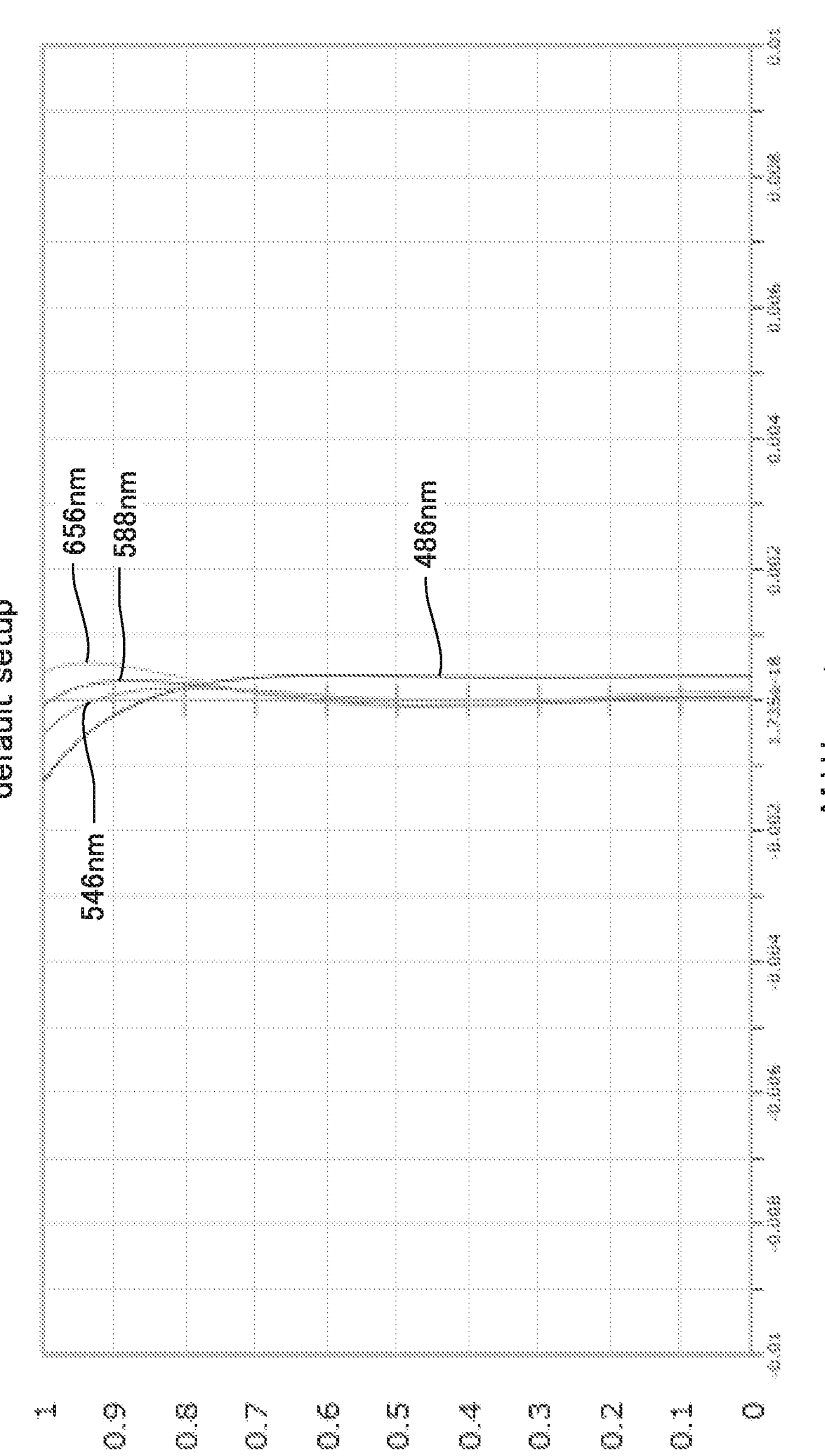
FIG. 19 is a graph of a longitudinal aberration in a first setup of Example 3.
Figure 20:
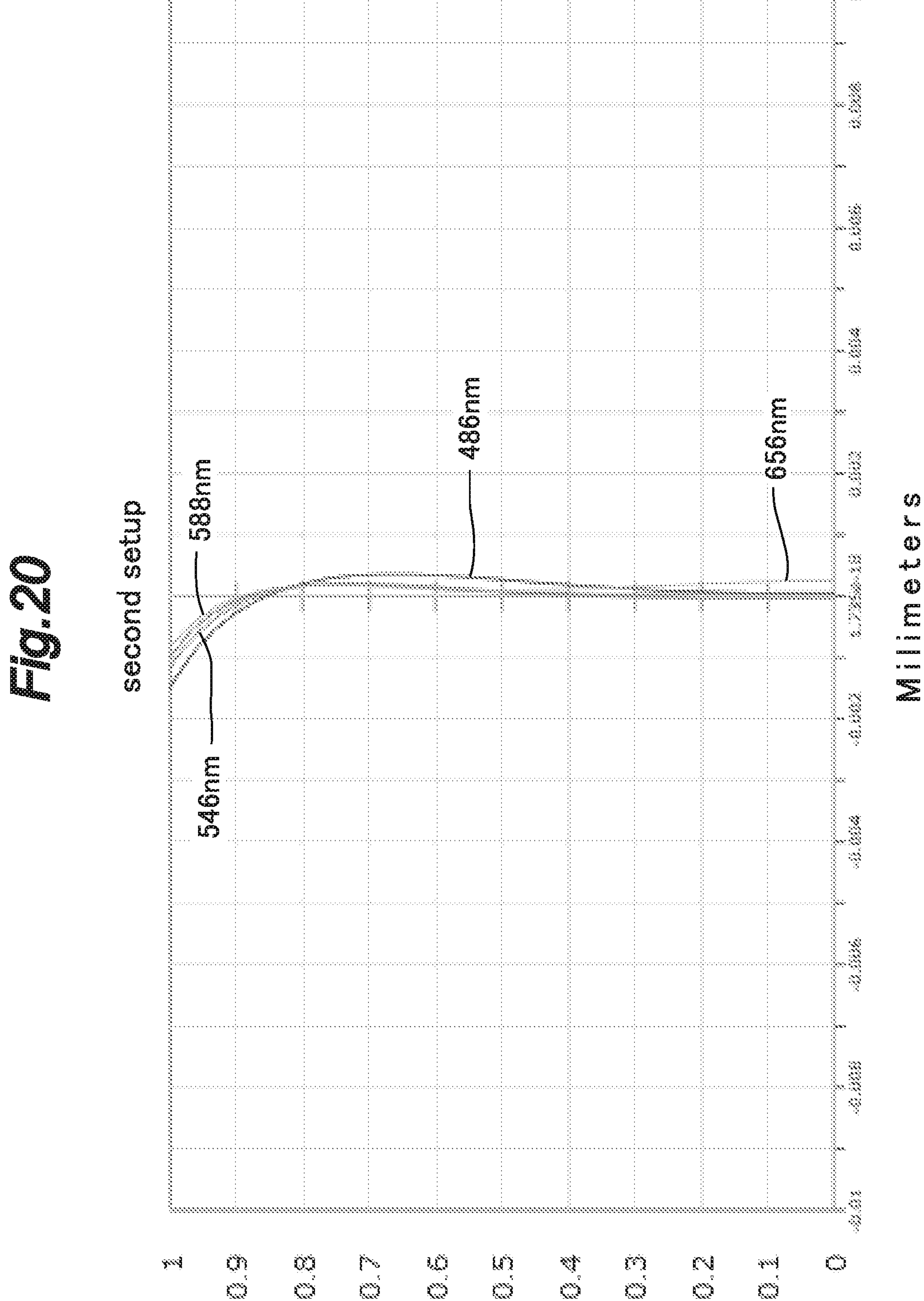
FIG. 20 is a graph of a longitudinal aberration in a second setup of Example 3.
Figure 21:
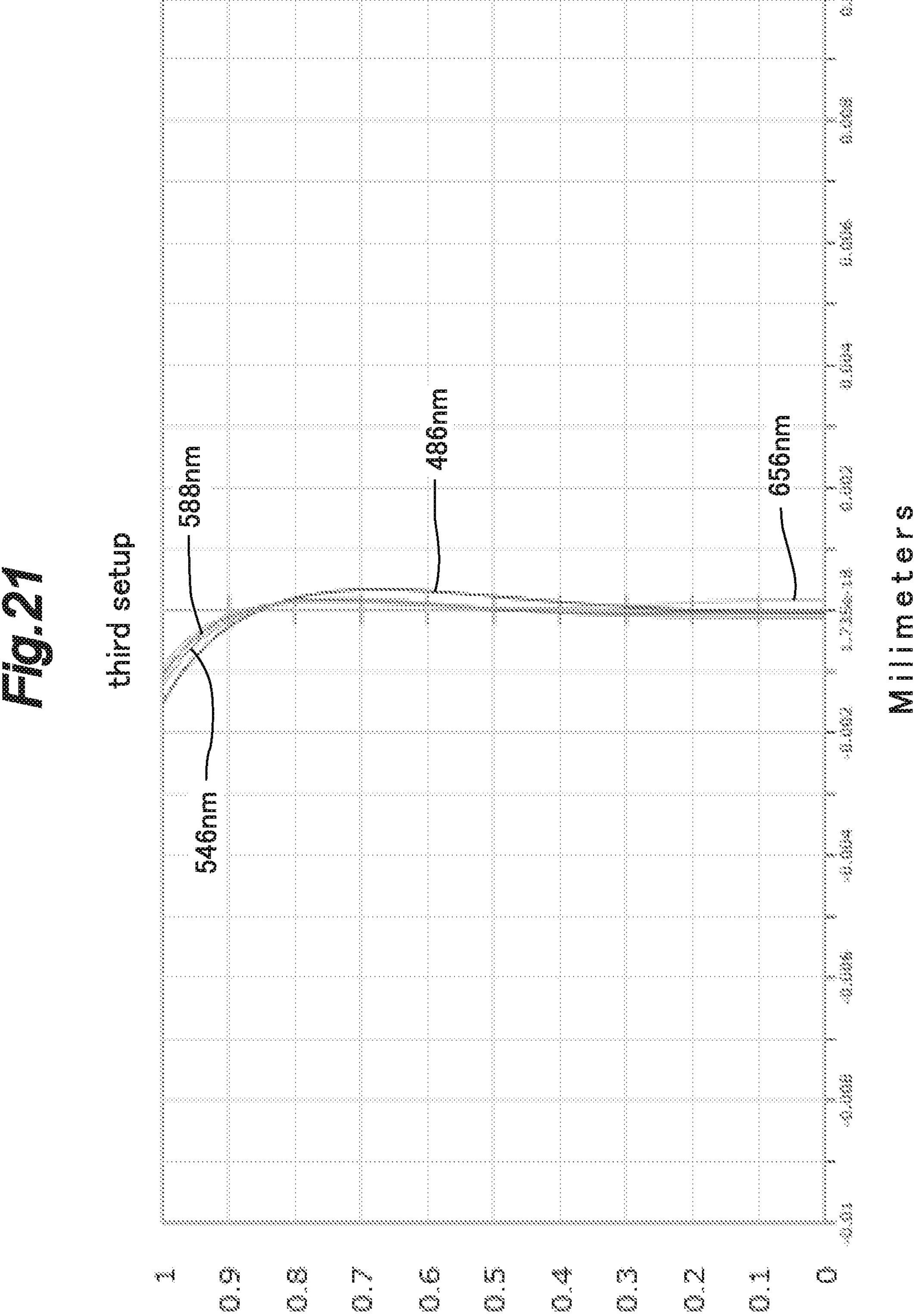
FIG. 21 is a graph of a longitudinal aberration in a third setup of Example 3.
Figure 22A:
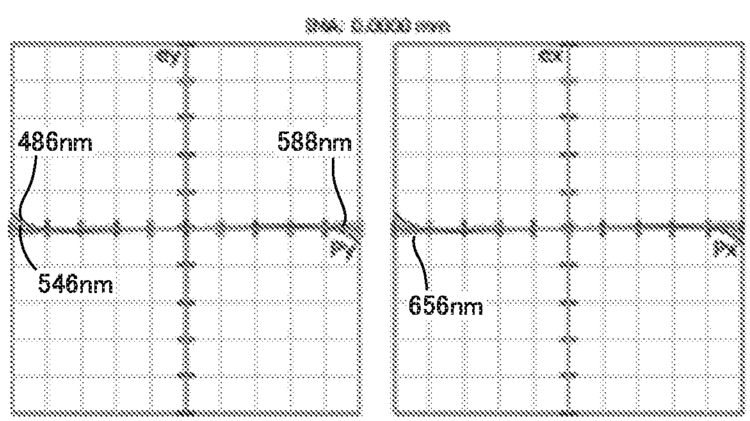
FIGS. 22A to 22C are graphs of a lateral aberration in the first setup of Example 3.
Figure 22B:
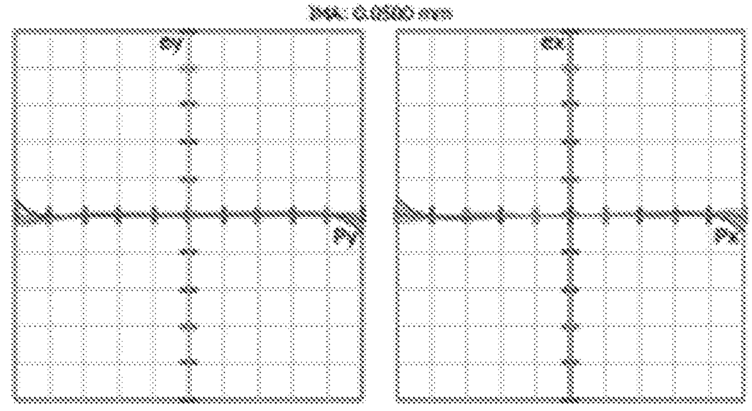
Figure 22C:
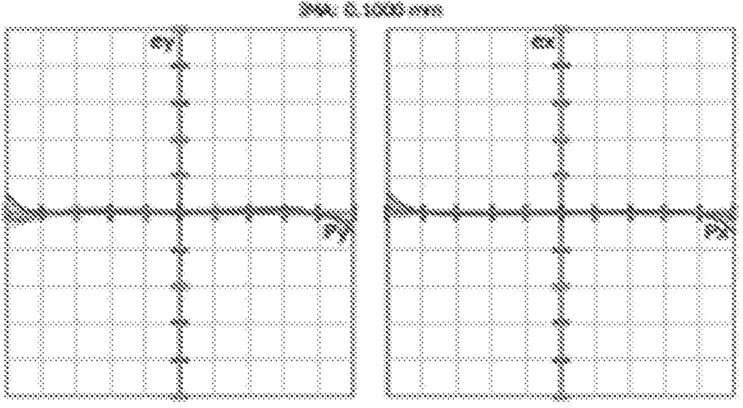
Figure 23A:
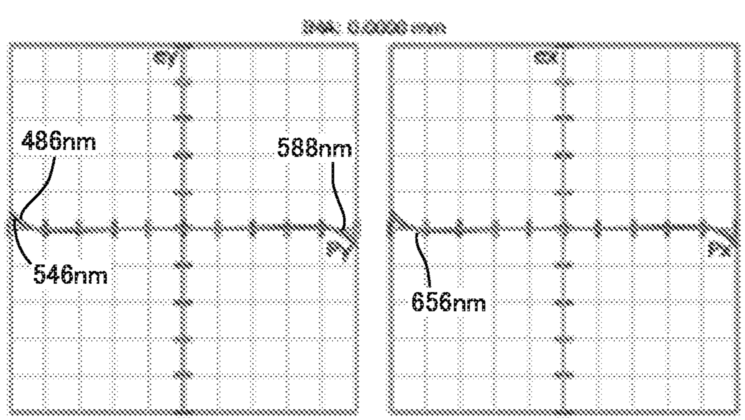
FIGS. 23A to 23C are graphs of a lateral aberration in the second setup of Example 3.
Figure 23B:
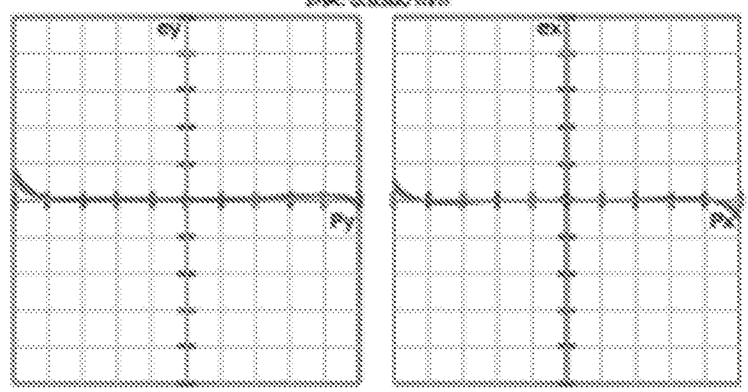
Figure 23C:
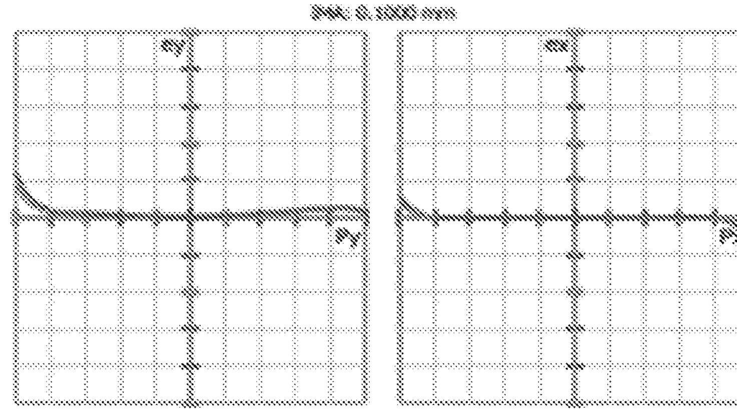
Figure 24A:
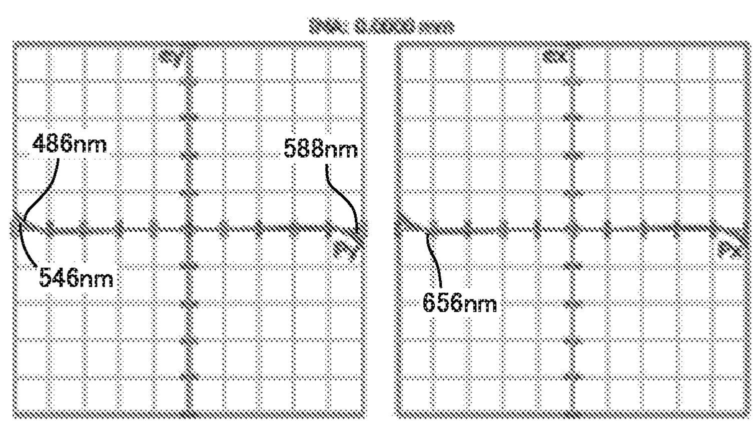
FIGS. 24A to 24C are graphs of a lateral aberration in the third setup of Example 3.
Figure 24B:
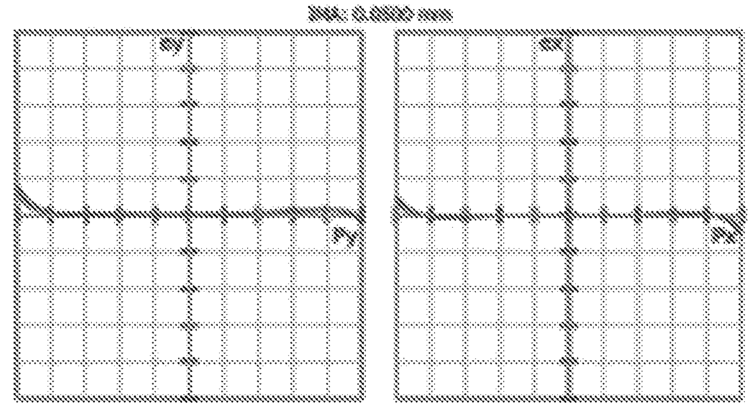
Figure 24C:
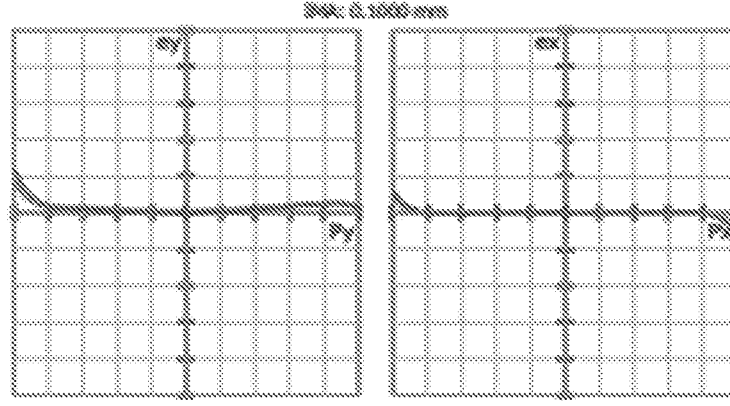

FIG. 18 is a cross-section view of an optical system in a microscope objective 1 of Example 3. FIGS. 19 to 21 are graphs of longitudinal aberration of the microscope objective 1 in the first (default) to third setups, respectively. FIGS.

22A to 22C, 23A to 23C, and 24A to 24C are graphs of lateral aberration of the microscope objective 1 in the first (default) to third setups, respectively.

The microscope objective 1 of Example 3 includes a first fixed lens group FA, a second movable lens group B, a first movable lens group A, and a second fixed lens group FB. The first fixed lens group FA is composed of a twenty-first lens component L21 formed of a cemented doublet. The second movable lens group B is composed of a twenty-second lens component L22. The first movable lens group A is composed of a cemented doublet (a twenty-third lens component L23) with a plano-convex lens A1 and a plano-concave lens A2. The second fixed lens group FB is composed of a plurality of lens components (a twenty-fourth lens component L24, a twenty-fifth lens component L25, a twenty-sixth lens component L26, a twenty-seventh lens component L27, a twenty-eighth lens component L28, and a twenty-ninth lens component L29) including cemented elements.

When the first movable lens group A travels along the optical axis to correct the axial chromatic aberration, the second movable lens group B remains stationary.

The first correction means Ac operates the first movable lens group A to move along the optical axis. Further, the second correction means Bc operates the second movable lens group B to move along the optical axis.

The first movable lens group A is composed of a cemented doublet with the plano-convex lens A1 and the plano-concave lens A2.

The second movable lens group B is formed of a meniscus lens whose both surfaces have the same curvature. According to this configuration, the power of the second movable lens group B becomes nearly zero, so that it is possible to selectively change the spherical aberration without exercising significant influence on the axial chromatic aberration.

An observation target is placed on a polystyrene micro plate. FIG. 18, which is a schematic view of the optical system, only shows the bottom of a well thereof.

An immersion liquid is applied to the gap between the microplate and the microscope objective 1.

In the first (default) setup, microplate with prescribed thickness and a prescribed immersion liquid are used. The reference wavelength is d-line. In the second setup, different immersion liquid from the first setup is used. Further, in the third setup, the thickness of the microplate (polystyrene) is different from that of the second setup.

The lens data of Example 3 is shown in the following Table 9. All glass materials starting with "S-" in Table 9 are names of glass manufactured by OHARA INC. Further, "POLYSTYR" indicates polystyrene.

TABLE 9

| surface number | radius of curvature [mm] | distance [mm] | material |
|---|---|---|---|
| 0 | Infinity | 1.00E+10 | |
| 1 | Infinity | 15.4080 | |
| 2 | Infinity | −15.4080 | |
| 3 | −13.240000 | 1.0000 | S-BSM81 |
| 4 | 12.000000 | 2.4000 | S-TIH11 |
| 5 | 100.870000 | d(5) | |
| 6 | 13.500000 | 1.5000 | S-NPH1W |
| 7 | 13.500000 | d(7) | |
| 8 | Infinity | 2.0000 | S-FPM2 |
| 9 | 30.000000 | 3.0000 | S-TIM8 |
| 10 | Infinity | d(10) | |
| 11 | −286.850000 | 1.5000 | S-NBH59 |

TABLE 9-continued

| surface number | radius of curvature [mm] | distance [mm] | material |
|---|---|---|---|
| 12 | 19.620000 | 4.5000 | S-FPL55 |
| 13 | −28.520000 | 0.3000 | |
| 14 | 30.890000 | 5.2000 | S-FPL55 |
| 15 | −13.120000 | 1.500 | S-BSL7 |
| 16 | 14.680000 | 4.5000 | S-FPL55 |
| 17 | −58.610000 | 0.3000 | |
| 18 | 16.750000 | 5.7000 | S-FPL55 |
| 19 | −23.920000 | 1.5000 | S-NBM51 |
| 20 | 368.900000 | 1.0000 | |
| 21 | 17.550000 | 5.0000 | S-FPL55 |
| 22 | −75.430000 | 0.3000 | |
| 23 | 9.370000 | 3.5000 | S-LAH97 |
| 24 | 28.670000 | 1.5555 | |
| 25 | Infinity | 2.0000 | S-BSL7 |
| 26 | Infinity | d(26) | immersion liquid |
| 27 | Infinity | d(27) | POLYSTYR |
| 28 | Infinity | — | — |

TABLE 10

| | |
|---|---|
| NA | 0.75 |
| focal distance[mm] | 4.0 |
| field of view Y | 0.1 |

TABLE 11

| | immersion liquid C | immersion liquid D |
|---|---|---|
| refractive index | 1.333 | 1.36 |
| Abbe number | 55.7943 | 52.6 |

TABLE 12

| | first state | second state | third state |
|---|---|---|---|
| | immersion liquid | | |
| | immersion liquid C | immersion liquid D | immersion liquid D |
| thickness of polystyrene(d27) | 1.0000 | 1.0000 | 1.0200 |
| d(5) | 20.0000 | 24.0052 | 24.0846 |
| d(7) | 7.3000 | 4.0426 | 4.0501 |
| d(10) | 2.1750 | 1.4276 | 1.3407 |
| d(26) | 4.0450 | 4.0980 | 4.0803 |

Example 4

FIG. 25 is a schematic diagram showing an outline of the microscope observation system 100 of the present embodiment. The microscope observation system 100 at least includes a plurality of microscope objectives 1, the objective lens correction controller 21 that operates objective lens correction means (namely, the first correction means Ac and the second correction means Bc of each microscope objective 1), and an image acquisition device 3. Each microscope objective 1 includes the first correction means Ac that corrects the axial chromatic aberration, and the second correction means Bc that corrects the spherical aberration.

For example, a sample S observed with the microscope observation system 100 is a cultured cell accommodated in a container 6 such as a microplate.

The transmitted light is delivered down to the sample S on a stage 7 from an epi-illumination device installed above the stage.

As shown in FIG. 25, the plurality of microscope objective 1 are installed on a revolver 8, which are switched to the observation target. Each microscope objective 1 forms an image of the sample S in combination with the tube lens unit 2.

The image of the sample S is acquired by the image acquisition device 3.

The integrated workstation 20 preferably includes the computer 23 to which the image acquired by the image acquisition device 3 is output.

The first correction means Ac and the second correction means Bc included in each microscope objective 1 are controlled via the microscope controller 22. It is possible to get a setup where preferred imaging performance is successfully exhibited with an appropriate correction amount based on the image data from the image acquisition device 3.

The invention claimed is:

1. A microscope objective, comprising:

a first movable lens group that is movable along an optical axis;

a first correction means configured to move the first movable lens group along the optical axis to correct axial chromatic aberration;

a second movable lens group that is movable along the optical axis; and a second correction means configured to move the second movable lens group along the optical axis to correct spherical aberration, wherein the first movable lens group is composed of a cemented doublet with a plano-convex lens and a plano-concave lens, and the plano-convex lens and the plano-concave lens satisfy following conditional expressions (1) and (2):

$$|n_1 - n_2| < 0.05; \quad (1)$$

$$|\nu_1 - \nu_2| > 10; \quad (2)$$

$n_1$: refractive index of the plano-convex lens on a reference wavelength;

$n_2$: refractive index of the plano-concave lens on the reference wavelength;

$\nu_1$: Abbe number of the plano-convex lens;

$\nu_2$: Abbe number of the plano-concave lens.

2. A microscope observation system, comprising:

the microscope objective according to claim 1;

an integrated workstation configured to control the first correction means and the second correction means of the microscope objective;

a tube lens unit configured to form an image in combination with the microscope objective; and an image acquisition device configured to acquire the image formed by the tube lens unit, wherein the integrated workstation is configured to calculate a correction amount using image data acquired by the image acquisition device, and control the first correction means and the second correction means based on the calculated correction amount.

3. The microscope objective according to claim 1, wherein, at the reference wavelength, the first movable lens group behaves substantially as a parallel plane plate, such that movement of the first movable lens group changes the axial chromatic aberration without substantially changing the spherical aberration, and movement of the second movable lens group corrects the spherical aberration without substantially changing the axial chromatic aberration.

* * * * *